United States Patent
Hagai et al.

(10) Patent No.: US 7,463,387 B2
(45) Date of Patent: Dec. 9, 2008

(54) MULTILEVEL VALUE OUTPUT DEVICE

(75) Inventors: Naoki Hagai, Komaki (JP); Masashi Ueda, Nagoya (JP); Masashi Kuno, Oobu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 929 days.

(21) Appl. No.: 10/608,477

(22) Filed: Jun. 30, 2003

(65) Prior Publication Data

US 2004/0001231 A1 Jan. 1, 2004

(30) Foreign Application Priority Data

Jul. 1, 2002 (JP) ............................. 2002-192074

(51) Int. Cl.
*H04N 1/405* (2006.01)
*G06K 15/00* (2006.01)
*G06T 5/00* (2006.01)

(52) U.S. Cl. .................. 358/3.03; 358/1.9; 358/3.14; 358/3.04; 358/3.05; 358/2.1; 358/1.12; 358/1.13; 358/443; 358/448; 358/3.13; 358/3.15; 358/3.16; 358/3.18; 358/3.17; 358/3.21; 358/3.22; 358/1.15; 358/1.16; 358/3.19; 382/251; 382/260; 382/264; 382/274; 382/167; 382/252; 382/275

(58) Field of Classification Search ........................ None
See application file for complete search history.

(56) References Cited

U.S. PATENT DOCUMENTS

| | | | | |
|---|---|---|---|---|
| 5,387,987 A | * | 2/1995 | Ino | ............................. 358/3.03 |
| 5,870,503 A | * | 2/1999 | Kumashiro | .................. 382/252 |
| 6,195,468 B1 | * | 2/2001 | Yoshida | ....................... 382/270 |
| 6,625,327 B1 | * | 9/2003 | Ohshima et al. | ............. 382/270 |
| 6,917,446 B2 | * | 7/2005 | Tanaka et al. | ................. 358/1.9 |
| 7,009,731 B1 | * | 3/2006 | Yamamoto | ................... 358/1.9 |
| 7,110,141 B2 | * | 9/2006 | Yamamoto | ................... 358/1.9 |
| 2003/0169455 A1 | * | 9/2003 | Takahashi et al. | ........... 358/3.03 |
| 2005/0219621 A1 | * | 10/2005 | Yamamoto | .................. 358/3.03 |

FOREIGN PATENT DOCUMENTS

| | | | |
|---|---|---|---|
| JP | 11-252364 | * | 9/1999 |
| JP | A 11-252364 | | 9/1999 |
| JP | 2000-270210 | * | 9/2000 |
| JP | A-2000-270210 | | 9/2000 |
| JP | A-2001-144961 | | 5/2001 |

* cited by examiner

*Primary Examiner*—Twyler L Haskins
*Assistant Examiner*—Pawandeep S Dhingra
(74) *Attorney, Agent, or Firm*—Oliff & Berridge, PLC

(57) ABSTRACT

When the input value becomes close to the medium dot relative density value (Den_M), the large dot threshold value (Thre_L) and medium dot threshold value (Thre_M) become close to each other. It is possible to prevent output values from being converged to the particular medium-dot output value. When the input value becomes close to the small dot relative density value (Den_S), the medium dot threshold value (Thre_M) and the small dot relative density value (Den_S) become close to each other. It is possible to prevent output values from being converged to the particular small-dot output value.

22 Claims, 11 Drawing Sheets

Den_S : RELATIVE DENSITY VALUE
Input : INPUT VALUE
Output Average : Average of OUTPUT DENSITY VALUES

25% GENERATION FREQUENCY
50% GENERATION FREQUENCY
100% GENERATION FREQUENCY

MULTILEVEL VALUE OUTPUT DEVICE

BACKGROUND OF THE INVENTION

1. Field of the Invention

The present invention relates to a multilevel value output device that converts or quantizes image data, indicative of some tone, into a signal of a multilevel value that is indicative of one of three or more discrete levels in order to reproduce the tone by distributing dots.

2. Description of Related Art

A halftone process is an image process for reproducing tone represented by image data by distributing dots. One kind of the halftone process is an error-diffusion conversion process, in which a quantization error, which occurs when an input value indicative of density of a pixel is quantized, is distributed to nearby pixels, thereby reproducing the original tone. The error-diffusion conversion process is currently most frequently used because the process can reproduce images with high quality. An example of the error-diffusion conversion process is shown in FIG. 1.

It is noted that in this example, an input value falling in a range of 0 to 255 is converted into either one of four-level output values, that is, large-dot output value (3), medium-dot output value (2), small-dot output value (1), and non-dot output value (0). Four different relative density values, that is, large-dot relative density value Den_L (255), medium-dot relative density value Den_M (200), small-dot relative density value Den_S (66), and 0 are stored beforehand in a relative density storage section 122 in one to one correspondence with the four-level output values 3, 2, 1, and 0. It is noted that the relative density values have been determined by normalizing the four-level output values 3, 2, 1, and 0 based on the maximum density 255 that correspond to the highest output value (3).

An input value (in this example, an 8-bit value) indicating the density of the pixel subject to be processed is received as an input.

An adding process 118 is executed in a manner described below. Error values obtained at previously-processed peripheral pixels are retrieved from an error storage section 128. Weight coefficients for those peripheral pixels are retrieved from a distribution matrix 130. A correction amount is calculated based on the error values and on the weight coefficients. This correction amount is fed back to the input value of the subject pixel, which is now subject to the process, and is added to the input value to give a corrected value.

A comparing process 120 is executed to convert the corrected value into a multilevel output value (0, 1, 2, or 3) by comparing the corrected value with a predetermined plurality of threshold values (in this example, three threshold values: large-dot threshold value Thre_L (200), medium-dot threshold value Thre_M (66), and small-dot threshold value Thre_S (0)).

Then, a relative density referring process 124 is executed to refer to the relative density storage section 122 based on the multilevel output value, and one relative density value that corresponds to the multilevel output value is selected.

Then, a difference calculation process 126 is executed to calculate, as an error value, the difference between the thus selected relative density value and the corrected value. The error value is stored in the error storage section 128 in order to be distributed to unprocessed pixels.

During this kind of error-diffusion conversion process, although the input value originally indicates one of a great variety of different densities of 0 through 255, the resultant multilevel output value can represent one of only a few number of different values (that is, four values including 0, 66, 200, and 255). By using the four-level output value, it is possible to reproduce only four different densities at one pixel. However, as indicated by bold lines in FIG. 1, according to the error diffusion process, a feedback configuration is established by: the relative density referring process 124, the difference calculation process 126, storage of the error value at the storage section 128, distribution of the error by using the distribution matrix 128, and the adding process 118. A density error, which may not be reproduced at one pixel, is therefore distributed to unprocessed pixels. Accordingly, even though only four discrete densities are reproduced at the micro level (pixel level), desired various densities can be reproduced at the macro level.

SUMMARY OF THE INVENTION

It is noted that according to the conventional error-diffusion conversion process, as shown in FIG. 2, the threshold values Thre_L, Thre_M, and Thre_S are fixed to 200, 66, and 0, respectively, regardless of the change of the input value. In FIG. 2, the horizontal axis shows the input value, and the vertical axis shows how the threshold values Thre_L, Thre_M, and Thre_S are maintained as being fixed.

It is assumed that an input gradation image. The density value Input(X,Y) of the input gradation image is uniform along the horizontal (x) direction, but changes along the vertical (y) direction. At some x-coordinate, for example, the density value Input(X,Y) changes as shown along the vertical (y) direction from the y-coordinate of 1 to the y-coordinate of 201. The density value Input(X,Y) decreases from the y-coordinate of about 51 to the y-coordinate of about 81 by crossing the small dot relative density value Den_S (66) at the y-coordinate of about 61. According to the above-described conventional error-diffusion conversion process of FIG. 1, this input gradation image is processed by repeating a procedure in which one line of pixels along the X-axis is processed, and when processing of one line is completed, processing shifts one line along the Y-axis. As a result, the density values Input(X,Y) in the input gradation image are converted into multilevel output values outdata(X,Y). FIG. 3 also shows how an average-output-density value "Average-output-density(X, Y)" changes also at the subject x-coordinate along the y-coordinates of 1 to 201. It is noted that the average-output-density value "Average-output-density(X,Y)" at each pixel location (X,Y) is obtained by calculating an average of densities for several multilevel output values Outdata(X,Y) that are obtained at several pixels including the subject pixel (X,Y) and its peripheral adjacent pixels.

It is noted that the average-output-density value "Average-output-density(X,Y) indicates the average of output densities generated at the relevant pixel location (X,Y) and its nearby pixel locations, and therefore does not indicate the density of the actual output value Outdata(X,Y) obtained at the relevant pixel location (X,Y). The average-output density "Average-output-density(X,Y)" is plotted in FIG. 3 because the density of an output image is recognized not at the microlevel but at the macro level, and therefore the output image density can be represented correctly by the average of the output density values.

It is noted that in FIG. 3, the horizontal axis indicates the y-coordinates of the pixel locations, while the vertical axis indicates how the values Input(X,Y) and Average-output-density(X,Y) change relative to the small dot relative density value Den_S (66).

In the graph of FIG. 3, it can be confirmed that, although the curve of the Input(X,Y) forms a gentle gradation, the value Average-output-density(X,Y) fails to track the curve of the Input(X,Y) in the vicinity of the small-dot relative density value Den_S. It is impossible to reproduce the tone gradual change with high reproducibility in the vicinity of the small-dot relative density value Den_S. This is because, when the input values around the y-coordinates of 61 are converted into output values, small amounts of errors (differences between their corresponding corrected values and the relative density value Den_S) will be generated at those pixels. Accordingly, the input values around the y-coordinate of 61 continue being converted into the same output value until the small errors have been accumulated many times. Accordingly, the output values obtained around the y-coordinate of 61 are converged to some specific state. As a result, an undesirable false contour is visually identified around the y-coordinate of 61 due to visual characteristics known as the Mach band effect.

FIG. 4(A) is a functional block diagram showing a conventional dithering-type bi-level conversion process. According to the dithering-type bi-level conversion process, a corrected value is obtained by adding some value to an input value in a manner similar to the error diffusion-type multilevel conversion process. The corrected value is converted into an output value based on a result compared with a single fixed threshold value.

It is now assumed that no noise is added to the input value. It is also assumed that, as shown in FIG. 4(B), as the pixel location changes, the input value changes gradually from a value smaller than the threshold value to another value greater than the threshold value. In such a case, the output value will change in a stepwise manner between two discrete values including: a smaller value that is smaller than the subject threshold value and a higher value that is higher than the threshold value. It is impossible to reproduce the gradual tone change with high reproducibility. It is noted that in FIG. 4(B), the horizontal axis shows the pixel location, and the vertical axis shows how the input value and the output value change relative to the threshold value.

However, according to the dithering-type conversion process, noise such as a sine wave noise is added to the input value as shown in FIG. 5(A) to determine the corrected value. It is noted that in FIG. 5(A), the horizontal axis shows the pixel location, and the vertical axis shows how the input value and the corrected value change relative to the threshold value. As apparent from FIG. 5(A), when the sinusoidal-wave noise is added to the input value, the corrected value will exceed the threshold value with a probability whose value gradually changes in accordance with gradual changes of the input value.

More specifically, an output value will fluctuate with a probability whose amount changes in accordance with change in the input value. This leads to an area tone reproduction process. According to the area tone reproduction process, even though only two discrete output density states can be reproduced at micro level (pixel level), various tones can be reproduced at macro level by varying the frequency, at which one of the two output density states are generated. This is because tone is recognized from some wider area where several pixels are arranged adjacent to one another.

FIG. 5(B) illustrates how the area tone reproduction process reproduces three different tones at macro level by varying the frequency, at which the dark density state is generated.

It is apparent that according to the dithering conversion process, by adding a noise component to the input value, it is possible to reproduce many density states at macro level by employing the area tone reproduction method. An appropriate tonal representation can be achieved because suitable noise is added to the input value.

To contrast the error-diffusion process shown in FIG. 1 with this dithering process of FIG. 4(A) to FIG. 5(B), it can be seen that the feedback mechanism in the error diffusion process is equivalent to the noise addition mechanism in the dithering process. The case where the amount of error fed back by the feedback mechanism in the error diffusion process is almost zero is equivalent to the case where no noise is added to the input value in the dithering process. Appropriate tone reproduction may not be achieved when the error value of zero (0) is fed back in the error diffusion process.

In view of the above-described drawbacks, it is an objective of the present invention to provide an improved multilevel value output device that can reproduce with high reproducibility such a density that is in the vicinity of some relative density value.

In order to attain the above and other objects, the present invention provides a multilevel value output device, comprising: a relative density value storage portion that prestores therein at least three relative density values for at least three multilevel output values in one-to-one correspondence with each other, the at least three relative density values being defined dependently on a predetermined maximum density that is defined for a highest relative density value among the at least three relative density values; an input portion that receives an input value indicative of density of a pixel in an input image; a corrected value calculation portion that calculates a corrected value by adding to the input value at least a part of an error value that has been generated by at least one pixel near to the subject pixel; an output value generation portion that compares the corrected value with at least one of the at least two threshold values, that converts the corrected value into one of the at least three multilevel values based on the compared results, and that outputs a resultant multilevel output value, the output value generation portion referring to the threshold value storage portion and setting one relative density value that corresponds to the output value, the output value generation portion calculating a difference between the corrected value and the relative density value and setting the calculated result as an error value for the subject pixel; and an output-value generation control portion that, when the corrected value is close to each of at least one of the at least three relative density values, reduces a frequency, at which the output value generation portion converts the corrected value into one multilevel output value that corresponds to the subject relative density value, thereby reducing a frequency at which the error value for the subject pixel becomes close to zero.

According to another aspect, the present invention provides a multilevel value output device, comprising: a relative density value storage portion that prestores therein at least three relative density values for at least three multilevel output values in one-to-one correspondence with each other, the at least three relative density values being defined by normalizing the at least three multilevel output values based on a predetermined maximum density that is defined for a highest relative density value among the at least three relative density values, the at least three relative density values including a middle relative density value, a higher relative density value higher than the middle relative density value, and a lower relative density value lower than the middle relative density value, the at least three multilevel output values including a middle multilevel output value, a higher multilevel output value higher than the middle multilevel output value, and a lower multilevel output value lower than the middle multilevel output value, the higher, middle, and lower relative density values corresponding to the higher, middle, and lower multilevel output values, respectively; an input portion that receives an input value indicative of density of a pixel in an input image; a corrected value calculation portion that calculates a corrected value by adding to the input value at least a part of an error value that has been generated by at least one pixel near to the subject pixel; an output value generation portion that compares the corrected value with at least one of the at least two threshold values, the at least two threshold values including a higher threshold value and a lower threshold value that is lower than the higher threshold value, the output value generation portion converting the corrected value into one of the at least three multilevel values based on the compared results and outputting the resultant one multilevel output value, the output value generation portion converting the corrected value into the higher multilevel output value when the corrected value is greater than the higher threshold value, the output value generation portion converting the corrected value into the middle multilevel output value when the corrected value is between the higher threshold value and the lower threshold value, the output value generation portion converting the corrected value into the lower multilevel output value when the corrected value is smaller than the lower threshold value; a relative density setting portion that refers to the threshold value storage portion and that sets one relative density value that corresponds to the multilevel output value generated by the output value generation portion; an error value calculation portion that calculates a difference between the corrected value and the relative density value set by the relative density setting portion, and that sets the calculated result as an error value for the subject pixel; and a threshold setting portion that sets, upon receipt of the input value, the higher and lower threshold values in a manner that the higher and lower threshold values become close to each other when the input value becomes close to the middle relative density value.

According to another aspect, the present invention provides a multilevel value output method using a relative density value storage portion that prestores therein at least three relative density values for at least three multilevel output values in one-to-one correspondence with each other, the at least three relative density values being defined dependently on a predetermined maximum density that is defined for a highest relative density value among the at least three relative density values, the method comprising: receiving an input value indicative of density of a pixel in an input image; calculating a corrected value by adding to the input value at least a part of an error value that has been generated by at least one pixel near to the subject pixel; comparing the corrected value with at least one of the at least two threshold values, converting the corrected value into one of the at least three multilevel values based on the compared results, outputting a resultant multilevel output value, referring to the threshold value storage portion setting one relative density value that corresponds to the output value, calculating a difference between the corrected value and the relative density value, and setting the calculated result as an error value for the subject pixel; and reducing, when the corrected value is close to each of at least one of the at least three relative density values, a frequency, at which the corrected value is converted into one multilevel output value that corresponds to the subject relative density value, thereby reducing a frequency at which the error value for the subject pixel becomes close to zero.

According to another aspect, the present invention provides a multilevel value output method using a relative density value storage portion that prestores therein at least three relative density values for at least three multilevel output values in one-to-one correspondence with each other, the at least three relative density values being defined by normalizing the at least three multilevel output values based on a predetermined maximum density that is defined for a highest relative density value among the at least three relative density values, the at least three relative density values including a middle relative density value, a higher relative density value higher than the middle relative density value, and a lower relative density value lower than the middle relative density value, the at least three multilevel output values including a middle multilevel output value, a higher multilevel output value higher than the middle multilevel output value, and a lower multilevel output value lower than the middle multilevel output value, the higher, middle, and lower relative density values corresponding to the higher, middle, and lower multilevel output values, respectively, the method comprising: receiving an input value indicative of density of a pixel in an input image; calculating a corrected value by adding to the input value at least a part of an error value that has been generated by at least one pixel near to the subject pixel; comparing the corrected value with at least one of the at least two threshold values, the at least two threshold values including a higher threshold value and a lower threshold value that is lower than the higher threshold value, thereby converting the corrected value into one of the at least three multilevel values based on the compared results and outputting the resultant one multilevel output value, the comparing step converting the corrected value into the higher multilevel output value when the corrected value is greater than the higher threshold value, the comparing step converting the corrected value into the middle multilevel output value when the corrected value is between the higher threshold value and the lower threshold value, the comparing step converting the corrected value into the lower multilevel output value when the corrected value is smaller than the lower threshold value; referring to the threshold value storage portion and setting one relative density value that corresponds to the multilevel output value generated; calculating a difference between the corrected value and the set relative density value, and setting the calculated result as an error value for the subject pixel; and setting, upon receipt of the input value, the higher and lower threshold values in a manner that the higher and lower threshold values become close to each other when the input value becomes close to the middle relative density value.

According to another aspect, the present invention provides a multilevel value output program to be executed by a computer that has a relative density value storage portion storing therein at least three relative density values for at least three multilevel output values in one-to-one correspondence with each other, the at least three relative density values being defined dependently on a predetermined maximum density that is defined for a highest relative density value among the at least three relative density values, the program comprising: a program receiving an input value indicative of density of a pixel in an input image; a program calculating a corrected value by adding to the input value at least a part of an error value that has been generated by at least one pixel near to the subject pixel; a program comparing the corrected value with at least one of the at least two threshold values, converting the corrected value into one of the at least three multilevel values based on the compared results, outputting a resultant multilevel output value, referring to the threshold value storage portion, setting one relative density value that corresponds to the output value, calculating a difference between the corrected value and the relative density value, and setting the calculated result as an error value for the subject pixel; and a program reducing, when the corrected value is close to each of at least one of the at least three relative density values, a frequency, at which the corrected value is converted into one multilevel output value that corresponds to the subject relative density value, thereby reducing a frequency at which the error value for the subject pixel becomes close to zero.

According to another aspect, the present invention provides a recording medium storing a multilevel value output program and readable by a computer that has a relative density value storage portion storing therein at least three relative density values for at least three multilevel output values in one-to-one correspondence with each other, the at least three relative density values being defined dependently on a predetermined maximum density that is defined for a highest relative density value among the at least three relative density values, the multilevel value output program comprising: a program receiving an input value indicative of density of a pixel in an input image; a program calculating a corrected value by adding to the input value at least a part of an error value that has been generated by at least one pixel near to the subject pixel; a program comparing the corrected value with at least one of the at least two threshold values, converting the corrected value into one of the at least three multilevel values based on the compared results, outputting a resultant multilevel output value, referring to the threshold value storage portion, setting one relative density value that corresponds to the output value, calculating a difference between the corrected value and the relative density value, and setting the calculated result as an error value for the subject pixel; and a program reducing, when the corrected value is close to each of at least one of the at least three relative density values, a frequency, at which the corrected value is converted into one multilevel output value that corresponds to the subject relative density value, thereby reducing a frequency at which the error value for the subject pixel becomes close to zero.

According to another aspect, the present invention provides a multilevel value output program to be executed by a computer that has a relative density value storage portion storing therein at least three relative density values for at least three multilevel output values in one-to-one correspondence with each other, the at least three relative density values being defined by normalizing the at least three multilevel output values based on a predetermined maximum density that is defined for a highest relative density value among the at least three relative density values, the at least three relative density values including a middle relative density value, a higher relative density value higher than the middle relative density value, and a lower relative density value lower than the middle relative density value, the at least three multilevel output values including a middle multilevel output value, a higher multilevel output value higher than the middle multilevel output value, and a lower multilevel output value lower than the middle multilevel output value, the higher, middle, and lower relative density values corresponding to the higher, middle, and lower multilevel output values, respectively, the program comprising: a program of receiving an input value indicative of density of a pixel in an input image; a program of calculating a corrected value by adding to the input value at least a part of an error value that has been generated by at least one pixel near to the subject pixel; a program of comparing the corrected value with at least one of the at least two threshold values, the at least two threshold values including a higher threshold value and a lower threshold value that is lower than the higher threshold value, thereby converting the corrected value into one of the at least three multilevel values based on the compared results and outputting the resultant one multilevel output value, the comparing program converting the corrected value into the higher multilevel output value when the corrected value is greater than the higher threshold value, the comparing program converting the corrected value into the middle multilevel output value when the corrected value is between the higher threshold value and the lower threshold value, the comparing program converting the corrected value into the lower multilevel output value when the corrected value is smaller than the lower threshold value; a program of referring to the threshold value storage portion and setting one relative density value that corresponds to the multilevel output value generated; a program of calculating a difference between the corrected value and the set relative density value, and setting the calculated result as an error value for the subject pixel; and a program of setting, upon receipt of the input value, the higher and lower threshold values in a manner that the higher and lower threshold values become close to each other when the input value becomes close to the middle relative density value.

According to another aspect, the present invention provides a recording medium storing a multilevel value output program and readable by a computer that has a relative density value storage portion storing therein at least three relative density values for at least three multilevel output values in one-to-one correspondence with each other, the at least three relative density values being defined by normalizing the at least three multilevel output values based on a predetermined maximum density that is defined for a highest relative density value among the at least three relative density values, the at least three relative density values including a middle relative density value, a higher relative density value higher than the middle relative density value, and a lower relative density value lower than the middle relative density value, the at least three multilevel output values including a middle multilevel output value, a higher multilevel output value higher than the middle multilevel output value, and a lower multilevel output value lower than the middle multilevel output value, the higher, middle, and lower relative density values corresponding to the higher, middle, and lower multilevel output values, respectively, the program comprising: a program of receiving an input value indicative of density of a pixel in an input image; a program of calculating a corrected value by adding to the input value at least a part of an error value that has been generated by at least one pixel near to the subject pixel; a program of comparing the corrected value with at least one of the at least two threshold values, the at least two threshold values including a higher threshold value and a lower threshold value that is lower than the higher threshold value, thereby converting the corrected value into one of the at least three multilevel values based on the compared results and outputting the resultant one multilevel output value, the comparing program converting the corrected value into the higher multilevel output value when the corrected value is greater than the higher threshold value, the comparing program converting the corrected value into the middle multilevel output value when the corrected value is between the higher threshold value and the lower threshold value, the comparing program converting the corrected value into the lower multilevel output value when the corrected value is smaller than the lower threshold value; a program of referring to the threshold value storage portion and setting one relative density value that corresponds to the multilevel output value generated; a program of calculating a difference between the corrected value and the set relative density value, and setting the calculated result as an error value for the subject pixel; and a program of setting, upon receipt of the input value, the higher and lower threshold values in a manner that the higher and lower threshold values become close to each other when the input value becomes close to the middle relative density value.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENT

Figure 1:
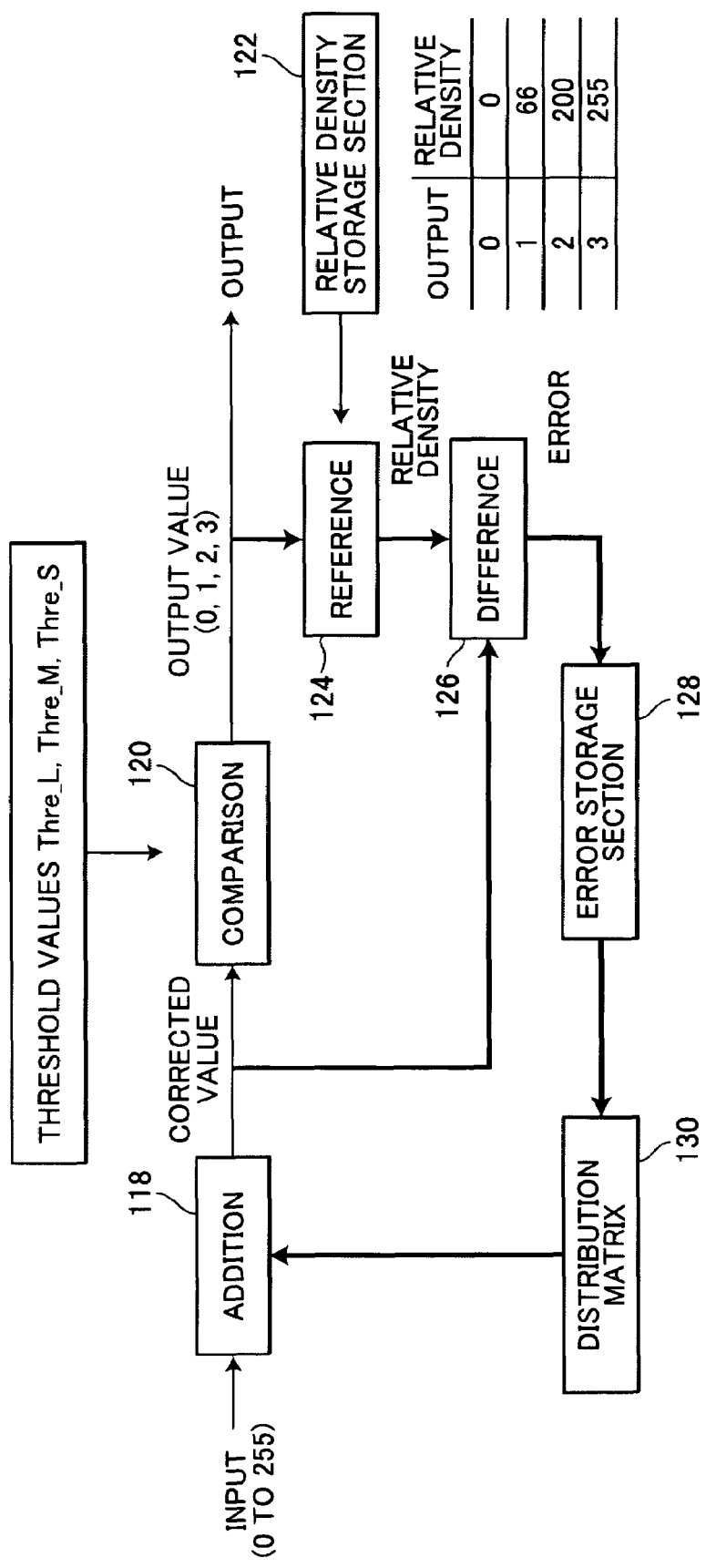
FIG. 1 is a functional block diagram of a conventional error-diffusion multilevel value conversion process.

A multilevel value output device according to a preferred embodiment of the present invention will be described while referring to the accompanying drawings wherein like parts and components are designated by the same reference numerals to avoid duplicating description.

Figure 6A:
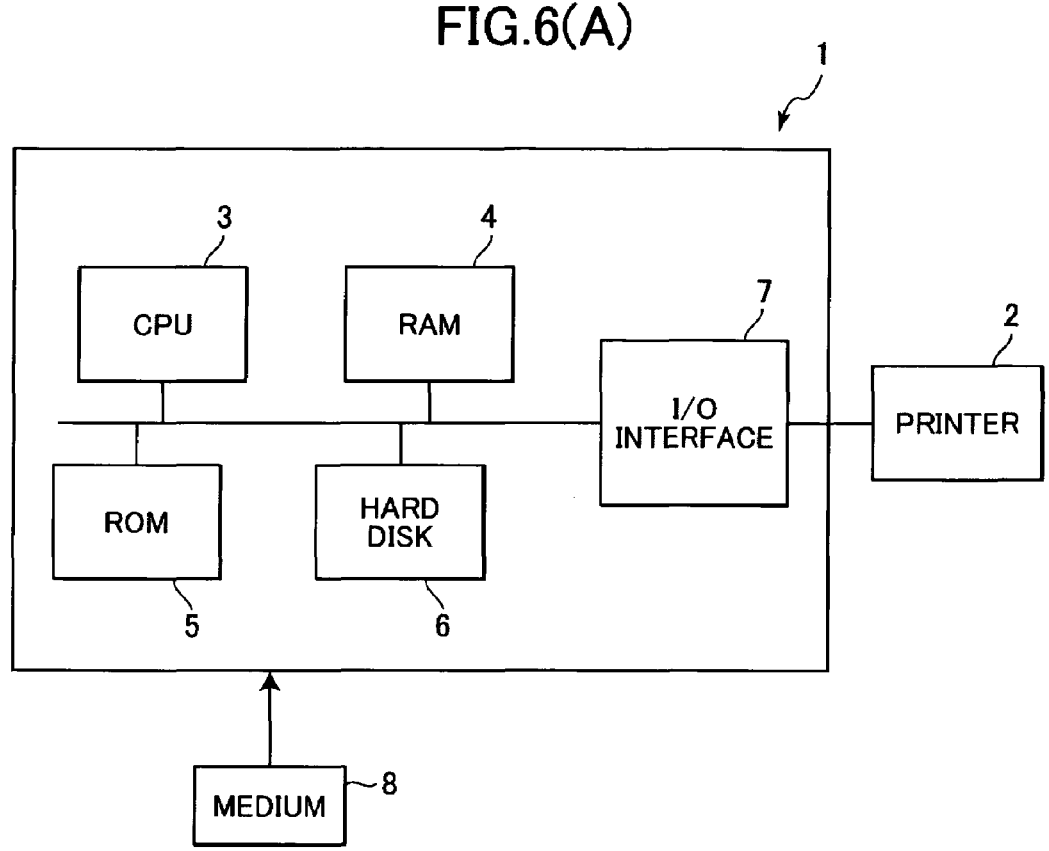
FIG. 6(A) is a block diagram showing a configuration Of a multilevel value output device according to an embodiment of the present invention.

As shown in FIG. 6(A), a multilevel value output device 1 according to this embodiment includes a personal computer 1. The personal computer 1 is electrically connected to a printer 2. The personal computer 1 is provided with: a CPU 3, a RAM 4, a ROM 5, a hard disk 6, and an input/output interface 7 which is connected to the printer 2.

Data of Equations (1) through (14) to be described later is stored in the hard disk 6. The multilevel value output device 1 performs a threshold value calculation process by having the CPU 3 calculate Equations (1) through (14).

Figure 7:
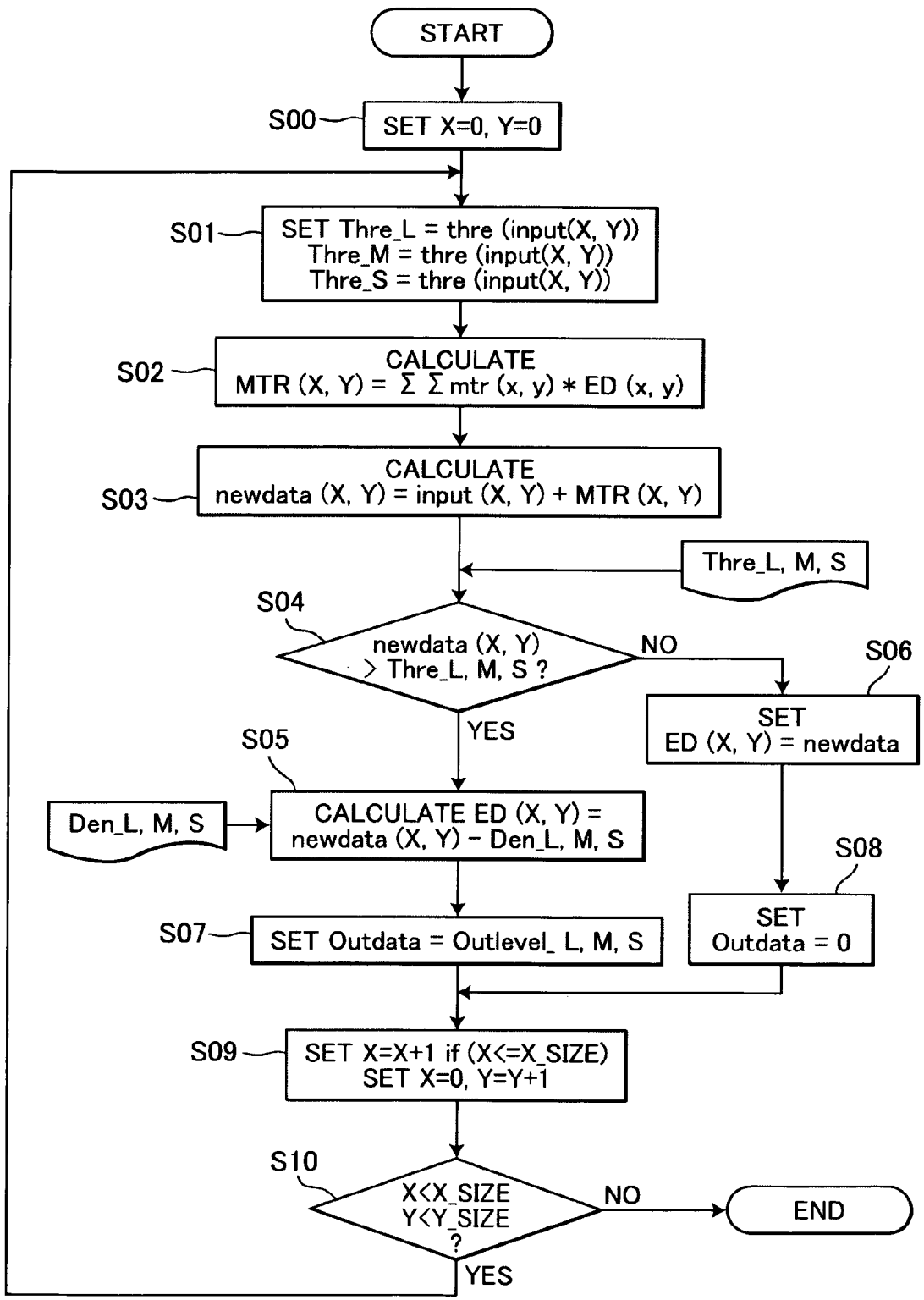
FIG. 7 is a flowchart of the multilevel value conversion process according to the embodiment.

Also in the hard disk 6, data of the multilevel value conversion program shown in FIG. 7 is installed as part of a printer driver program. The multilevel value output device 1 performs a multilevel value conversion process of the present embodiment by having the CPU 3 execute the multilevel value conversion program.

It is noted that the multilevel value output device 1 performs the threshold value calculation process prior to executing the multilevel value conversion process.

It is noted that the data of the multilevel value conversion program shown in FIG. 7 and Equations (1) through (14) may not be stored in the hard disk 6, but may be stored in the ROM 5.

Or, the data of the multilevel value conversion program and Equations (1) through (14) can be stored in another recording medium 8, from which the computer 1 can download data into the hard disk 6 various kinds of recording media, such as a flexible disk, CD-ROM, or the like can be used as the recording medium 8. The data can therefore be freely distributed to many users having personal computers.

Figure 6C:
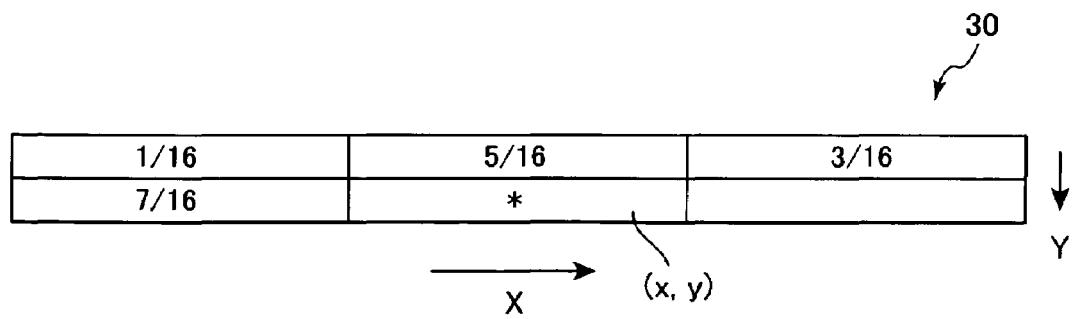
FIG. 6(C) shows an example of a distribution matrix used during the multilevel value conversion process of FIG. 6(B)
Figure 6B:
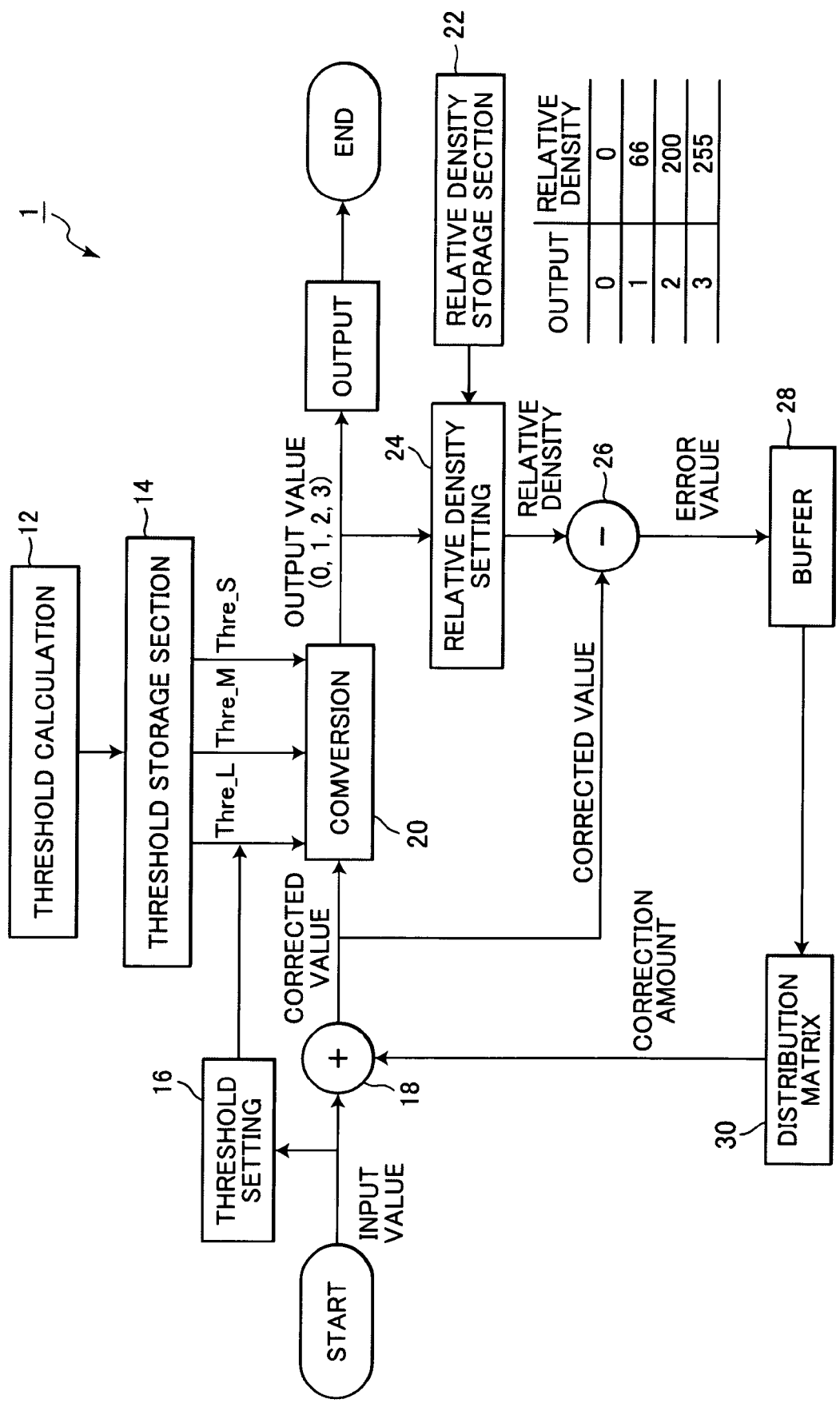
FIG. 6(B) is a functional block diagram of a multilevel value conversion process and a threshold value calculation process executed by the multilevel value output device according to the embodiment of the present invention.

FIG. 6(B) is a functional block diagram of the multilevel value output device 1, which executes both of the multilevel value conversion process and the threshold value calculation process.

First, an overview of the processing by the multilevel value output device 1 will be described with reference to FIG. 6(B).

It is noted that as shown in FIG. 6(B), the multilevel value output device 1 includes: a threshold value storage section 14, a relative density value storage section 22, a buffer 28, and a distribution matrix 30. The relative density value storage section 22 is previously formed in the RAM 4, for example. The distribution matrix 30 is previously stored in the hard disk 6, for example. The buffer 28 is prepared in the RAM 4, for example. The threshold value storage section 14 is prepared in the hard disk 6, for example.

First, an overview will be given of multilevel value conversion process (image processing). This multilevel value conversion process employs an error diffusion method.

The multilevel value output device 1 receives an input value of 8-bit data that is indicative of a density value among 256 discrete densities in a range of 0 to 255. More specifically, the multilevel value conversion program in the printer driver program receives the 8-bit input value from an application program or the like. The multilevel value output device 1 executes the multilevel value conversion process to convert the input value into one of multilevel (four-level) output values: (0), (1), (2), and (3). The multilevel value output device 1 outputs the four-level output value 0, 1, 2, or 3 to the printer 2. The four-level output values 0, 1, 2, and 3 are indicative of whether or not a dot should be outputted by the printer 2 and the size of the dot if the dot should be outputted.

More specifically, the output value (3) indicates that a large dot indicative of a highest density should be outputted, the output value (2) indicates that a medium dot indicative of a second density should be outputted, the output value (1) indicates that a small dot indicative of a third density should be outputted, and the output value (0) indicates that no dots indicative of a lowest density should be outputted.

It is noted that before executing the multilevel value conversion process, the multilevel value output device 1 executes a threshold value calculation process 12 by calculating Equations (1)-(14) to be described later, and determines a large-dot threshold value (Thre_L), a medium-dot threshold value (Thre_M), and a small-dot threshold value (Thre_S) for each of all the 256 different input values that will possibly be inputted to the multilevel value output device 1. Data of the thus obtained three threshold values Thre_L, Thre_M, Thre_S are stored in the threshold value storage section 14.

In the relative density value storage section 22, a large dot relative density value (Den_L) of 255; a medium dot relative density value (Den_M) of 200; a small dot relative density value (Den_S) of 66; and a non-dot relative density value of 0 are stored beforehand in one-to-one correspondence with the four-level output values 3, 2, 1, and 0. The relative density values (Den_L), (Den_M), (Den_S), and zero have been determined by normalizing the four-level output values 3, 2, 1, and 0 based on the maximum density (255) that can be outputted and that corresponds to the highest output value (3).

Next, the multilevel value processing (image processing) will be described in more detail.

The multilevel value output device 1 carries out the image processing by repeating a procedure in which one line of pixels along the X-axis of an image is processed in order as pixels of interest, and when processing of one line is completed, processing shifts one line along the Y-axis parts of error values generated at each pixel are distributed to its peripheral unprocessed pixels based on the distribution matrix 30.

More specifically, when the multilevel value output device 1 receives one input value Input(X,Y) indicating the density of a pixel (X,Y) that is now being subjected to the image processing, a threshold value setting process 16 is executed to refer to the threshold value storage section 14 and to read, from the threshold value storage section 14, a large dot threshold value (Thre_L), a medium dot threshold s value (Thre_M), and a small dot threshold value (Thre_S) that correspond to the present input value Input(X,Y).

Then, a corrected value calculation process 18 is executed to read, from the buffer 28, error values ED that have been generated at adjacent pixels (X−1,Y−1), (X,Y−1), (X+1,Y−1), and (X−1,Y) that are located near to the subject pixel (X,Y) and that have been processed already prior to the subject pixel (X,Y). Parts of the error values ED are collected by using the distribution matrix 30.

According to the present embodiment, as shown in FIG. 6(C), the distribution matrix 30 has weight coefficients mtr (X−1,Y−1) of 1/16, mtr(X,Y−1) of 5/16, mtr(X+1,Y−1) of 3/16, and mtr(X−1,Y) of 7/16, respectively, for pixels (X−1,Y−1), (X,Y−1), (X+1,Y−1) and (X−1,Y) that are located adjacent to the subject pixel (X,Y) and that have been processed prior to the subject pixel (X,Y).

The corrected value calculation process 18 is executed to receive, for the subject pixel (X,Y), a 1/16 part of an error ED (X−1,Y−1) generated at the upper-left pixel (X−1,Y−1), a 5/16 part of an error ED (x,Y−1) generated at the upper pixel (X,Y−1), a 3/16 part of an error ED (X+1,Y−1) generated at the upper-right pixel (X+1,Y−1), and a 7/16 part of an error ED (X−1,Y) generated at the left pixel (X−1,Y). Parts of errors generated at the already-processed pixels are collected in this way at the subject pixel (X,Y) and are set as a correction amount MTR(X,Y) for the subject pixel (X,Y). In other words, the total cumulative amount ΣΣmtr(X,Y)*ED (X,Y) of partial errors at those nearby pixels (X−1,Y−1), (X,Y−1), (X+1,Y−1) and (X−1,Y) is determined as the correction amount MTR(X,Y). The correction amount MTR(X,Y) is added to the input value Input(X,Y). As a result, a corrected value "newdata(X,Y)"=Input(X,Y)+MTR(X,Y) is obtained.

Next, a conversion process (threshold value comparison/output value generation process) 20 is executed to compare the corrected value "newdata(X,Y)" with the large dot threshold value (Thre_L), medium dot threshold value (Thre_M), and small dot threshold value (Thre_S), in this order, to generate a multilevel value output value 3, 2, 1, or 0.

To be more precise, when the corrected value newdata(X,Y) is greater than the large dot threshold value (Thre_L), the corrected value newdata(X,Y) is converted into the large-dot output value (3). When the corrected value newdata(X,Y) is smaller than or equal to the large dot threshold value (Thre_L) but greater than the medium dot threshold value (Thre_M), the corrected value newdata(X,Y) is converted into the medium-dot output value (2). When the corrected value newdata(X,Y) is smaller than or equal to the medium dot threshold value (Thre_M) but greater than the small dot threshold value (Thre_S), the corrected value newdata(X,Y) is converted into the small-dot output value (1) When the corrected value newdata(X,Y) is smaller than or equal to the small dot threshold value (Thre_S), the corrected value newdata(X,Y) is converted into the non-dot output value (0). A multilevel value output signal indicative of the thus determined multilevel output value is outputted to the printer 2.

A relative density value setting process 24 is then executed to refer to the relative density value storage section 22 based on the determined multilevel output value 3, 2, 1, or 0. One relative density value Den_L (255), Den_M (200), Den_S (66), or 0 that corresponds to the determined multilevel output value (3), (2), (1), or (0) is read from the relative density value storage section 22. The thus read-out relative density value 255, 200, 66, or 0 is set as a reference value for an error value calculation 26 for the present pixel (X,Y).

The error value calculation process 26 is then executed to calculate, as an error value ED(X,Y), a difference between the corrected value newdata(X,Y) and the relative density value Den_L (255), Den_M (200), Den_S (66), or 0 that has been set by the relative density value setting process 24.

The error ED(X,Y) thus calculated for the present pixel (X,Y) is stored in the buffer 28 and will be used during the image processing for its nearby pixels not yet processed.

Next will be described, with reference to FIG. 8, one example of the threshold value calculation process 12 that is executed prior to the above-described multilevel value conversion process.

The threshold value calculation process 12 is executed to calculate the large dot threshold value (Thre_L), medium dot threshold value (Thre_M), and small dot threshold value (Thre_S) in correspondence with each of all the 256 input values of 0 to 255 that will possibly be inputted as input values Input(X,Y) to the device 1 by executing the threshold value calculation process, and to store all the threshold values for all the 256 input values of 0 to 255 in the threshold value storage section 14.

Figure 8:
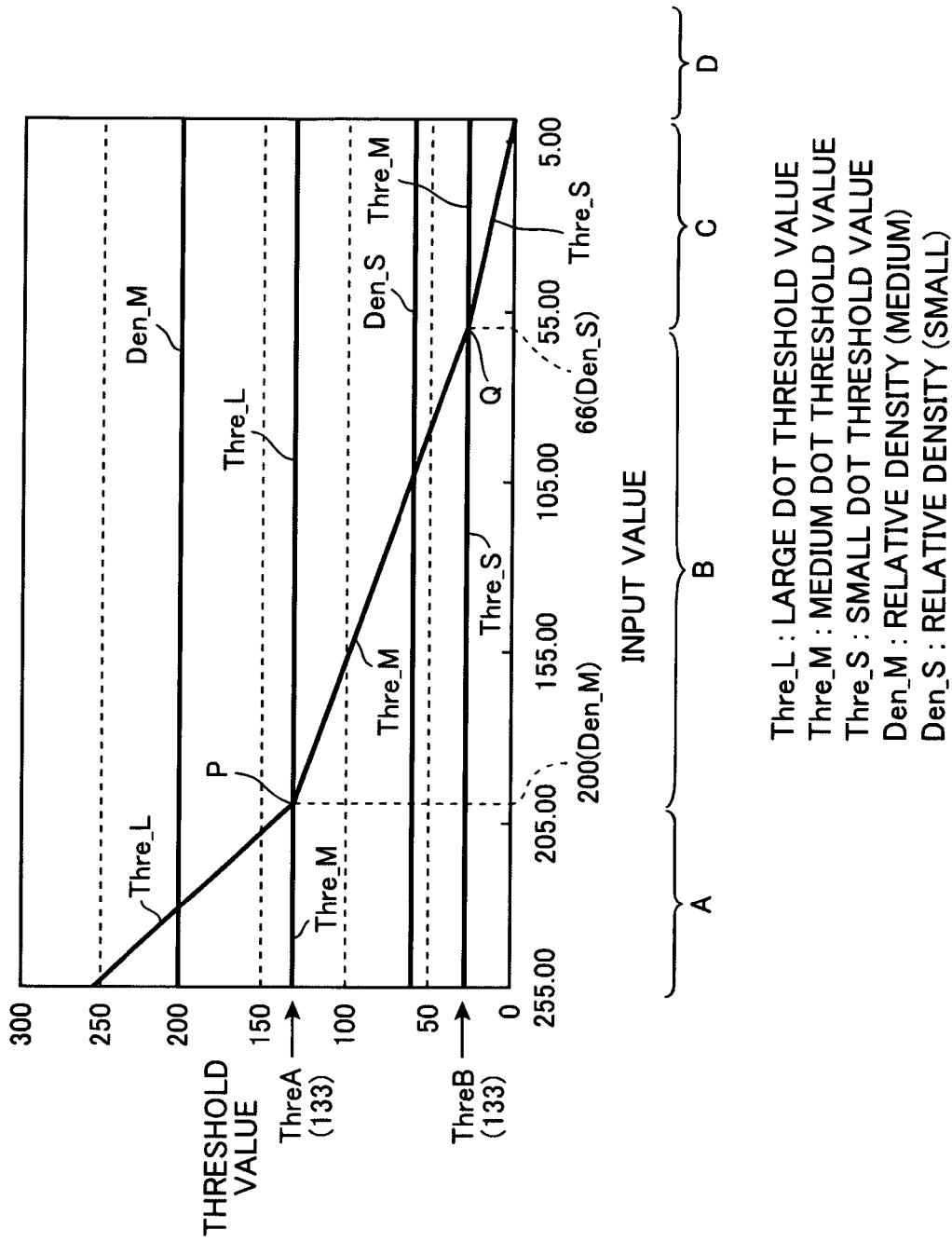
FIG. 8 is a graph how threshold values vary according to change in the Input value.

The threshold values (Thre_L), (Thre_M), and (Thre_S) are calculated by the threshold value calculation process 12 so that the values (Thre_L), (Thre_M), and (Thre_S) change according to changes of the input value in the range of 0 to 255 as shown in FIG. 8. In FIG. 8, the horizontal axis indicates the input value in the range of 0 to 255, while the vertical axis indicates how the values (Thre_L), (Thre_M), and (Thre_S) change. Along the horizontal axis, a first input-value range A is defined between the maximum density value (255) and the medium dot relative density (Den_M) (200), a second input-value range B is defined between the medium dot relative density (Den_M) (200) and the small medium dot relative density (Den_S) (66), a third input-value range C is defined between the small medium dot relative density (Den_S) (66) and the minimum density (0), and a fourth input-value range D is defined equal to or smaller than the minimum density (0).

As shown in FIG. 8, the large dot threshold value (Thre_L) decreases linearly from the maximum value (255) down to the value "threA" (133, in this example) as the input value decreases in the first input-value range A, and then is maintained unchanged at the value "threA" (133) in the second and third input-value ranges B and C. Although not shown in the drawing, the value (Thre_L) is maintained unchanged at the value "threA" (133) also in the fourth input-value range D.

The medium dot threshold value (thre_M) is maintained unchanged at the value "threA" (133) in the first input-value range A, decreases linearly from the value "threA" (133) down to another value "threB" (33, in this example) as the input value decreases in the second input-value range B, and then is maintained unchanged at the value "threB" (33) in the third input-value range C. Although not shown in the drawing, the value (Thre_M) is maintained unchanged at the value "threB" (33) also in the fourth input-value range D.

The small dot threshold value (Thre_S) is maintained unchanged at the value "threB" (33) in the first and second input-value ranges A and B, decreases linearly from the value "threB" (33) down to the minimum threshold value 0 as the input value decreases in the third input-value range C. Although not shown in the drawing, the value (Thre_S) is maintained unchanged at the minimum threshold value (0) in the fourth input-value range D.

As apparent from FIG. 8, a point P (Den_M (200), threA (133)) serves as inflection points for both of the line for the large dot threshold value (Thre_L) and the line for the medium dot threshold value (Thre_M), while another point Q (Den_S (66), threE (33)) serves as other inflection points for both of the line for the medium dot threshold value (Thre_M) and the line for the small dot threshold value (Thre_S).

During the threshold value calculation process, the lines for the threshold values (Thre_L), (Thre_M), and (Thre_S) are determined in a manner described below.

First, the values "threA" and "threB" are determined by calculating the following Equations (1) and (2):

$$threA = \frac{(Den\_M - Den\_S)}{2} + Den\_S \qquad (1)$$

$$threB = \frac{(Den\_S - 0)}{2} + 0 \qquad (2)$$

In this way, the value "threA" is set as an intermediate value between the medium-dot relative density value (Den_M) and the small-dot relative density value (Den_S). In this example, the value "threA" is calculated as being equal to 133. The value "threB" is set as an intermediate value between the small-dot relative density value (Den_S) and the minimum density value (0). In this example, the value "threB" is calculated as being equal to 33.

As shown in FIG. 8, the values "threA" and "threB" are used for determining the inflection points P (Den_M, threA) and Q (Den_S, threB).

Then, the threshold values (Thre_L), (Thre_M), and (Thre_S) are determined for the input values in all the four input-value ranges A, B, C, D in a manner described below.

For the first input-value range A, the values (Thre_L), (Thre_M), and (Thre_S) are determined by calculating the following Equations (3), (4), and (5):

$$Thre\_L = \frac{(255 - threA)}{(255 - Den\_M)} * input + 255 - \frac{(255 - threA)}{(255 - Den\_M)} * 255 \qquad (3)$$

$$Thre\_M = threA \qquad (4)$$

-continued $$Thre\_S = threB \qquad (5)$$

As apparent from Equation (3), the large dot threshold value (Thre_L) is represented by a straight line that connects the point (255, 255) to the inflection point P (200, 133). It is apparent from Equations (3) and (4) that when the input value decreases in the input-value range A toward the medium dot relative density value (Den_M) (200), the large dot threshold value (Thre_L) becomes gradually close to the medium dot threshold value (Thre_M) When the input value becomes equal to the medium dot relative density value (Den_M) (200), the value (Thre_L) becomes equal to the value (Thre_M).

For the second input-value range B, the threshold values (Thre_L), (Thre_M), and (Thre_S) are determined by calculating the following Equations (6), (7), and (8):

$$Thre\_L = threA \qquad (6)$$

$$Thre\_M = \frac{(threA - threB)}{(Den\_M - Den\_S)} * input + threA - \frac{(threA - threB)}{(Den\_M - Den\_S)} * Den\_M \qquad (7)$$

$$Thre\_S = threB \qquad (8)$$

As apparent from Equation (7), the medium dot threshold value (Thre_M) is represented by a straight line that connects the inflection point P (200, 133) to the other inflection point Q(66, 33) It is apparent from equations (6) and (7) that when the input value increases in the input-value range B toward the medium dot relative density value (Den_M) (200), the medium dot threshold value (Thre_M) becomes gradually close to the large dot threshold value (Thre_L). When the input value becomes equal to the medium dot relative density value (Den_M) (200), the value (Thre_M) becomes equal to the value (Thre_L). It is also apparent from equations (7) and (8) that when the input value decreases in the input-value range B toward the small dot relative density value (Den_S) (66), the medium dot threshold value (Thre_M) becomes gradually close to the small dot threshold value (Thre_S). When the input value becomes equal to the small dot relative density value (Den_S) (66), the value (Thre_M) becomes equal to the value (Thre_S).

For the third input-value range C, the threshold values (Thre_L), (Thre_M), and (Thre_S) are determined by calculating the following Equations (9), (10), and (11):

$$Thre\_L = threA \qquad (9)$$

$$Thre\_M = threB \qquad (10)$$

$$Thre\_S = [(threB - THRE\_MIN)/(Den\_S - 0)] * input + THRE\_MIN \qquad (11)$$

wherein THRE_MIN is the minimum value for the large-, medium-, small-dot threshold values Thre_L, Thre_M, and Thre_S. In this example, THRE_MIN is equal to zero (0) which is equal to the minimum density value (0) and the non-dot (minimum) relative density value (0) stored in the relative density storage section 22.

As apparent from Equation (11), the small dot threshold value (Thre_S) is represented by a straight line that connects the inflection point Q(66, 33) to the point (0, 0) It is apparent from equations (10) and (11) that when the input value increases in the input-value range C toward the small dot relative density value (Den_S) (66), the small dot threshold value (Thre_S) becomes gradually close to the medium dot threshold value (Thre_M) When the input value becomes equal to the small dot relative density value (Den_S) (66), the value (Thre_S) becomes equal to the value (Thre_M). It is also apparent from equation (11) that when the input value decreases in the input-value range C toward the minimum density value (0) the small dot threshold value (Thre_S) becomes gradually close to the minimum value THRE_MIN (0) for the threshold values When the input value becomes equal to the minimum density value (0), the threshold value (Thre_S) becomes equal to the value THRE_MIN (0).

For the fourth input-value range D, the threshold values (Thre_L), (Thre_M), and (Thre_S) are determined by calculating the following Equations (12), (13), and (14):

$$\text{Thre\_L} = \text{threA} \quad (12)$$

$$\text{Thre\_M} = \text{threB} \quad (13)$$

$$\text{Thre\_S} = \text{THRE\_MIN} \quad (14)$$

By executing the above processing for all the input densities, the threshold values (Thre_L), (Thre_M), and (Thre_S) are determined for all the input-value ranges A, B. C, and D. Data of the thus determined threshold values (Thre_L), (Thre_M), and (Thre_S) are stored in the threshold value storage section 14.

As described above, according to the present embodiment the threshold values (Thre_L). (Thre_M), and (Thre_S) are determined so that the large-dot threshold value (Thre_L) decreases linearly toward the inflection point P(200, 133) as the input value decreases in the input-value range A from the maximum density (255) to the medium dot relative density value Den_M (200). When the input value becomes equal to the medium dot relative density value Den_M, the large dot threshold value (Thre_L) becomes equal to the medium dot threshold value (Thre_M) The large dot threshold value (Thre_L) is maintained as being fixed to the value threA (133) in the input-value ranges B-D, that is, when the input value is less than the medium dot relative density value Den_M.

The medium dot threshold value (Thre_M) is maintained as being fixed to the value threA (133) in the input-value range A from the maximum density (255) to the medium dot relative density value Den_M (200). The medium dot threshold value (Thre_M) decreases linearly from the inflection point P(200, 133) toward the inflection point Q(66, 33) as the input value decreases in the input-value range B from the medium dot relative density value Den_M (200) to the small dot relative density value Den_S (66) when the input value becomes equal to the small dot relative density value Den_S, the medium dot threshold value (Thre_M) becomes equal to the small dot threshold value (Thre_S). The medium dot threshold value (Thre_M) is then maintained as being fixed to the value threB (33) in the input-value ranges C and D in which the input value is less than small dot relative density value Den_S (66).

The small dot threshold value (Thre_S) is maintained as being fixed to the value threB (33) in the input-value ranges A and B from the maximum density (255) to the small dot relative density value Den_S (66). The small dot threshold value (Thre_S) decreases linearly from the inflection point Q(66, 33) toward the point (0, 0) as the input value decreases in the input-value range C from the small dot relative density value Den_S (66) to the minimum density value (0). The small dot threshold value (Thre_S) is then maintained as being fixed to the value (0) in the input-value range D in which the input value is less than or equal to the minimum density value (0).

It is noted that when the input value is less than or equal to 0, the threshold values (Thre_L), (Thre_M), and (Thre_S) are thus maintained as being fixed to the values 133, 33, and 0, respectively.

After the threshold values (Thre_L), (Thre_M), and (Thre_S) are determined for all the input-value ranges A, B, C, and D and data of the threshold values (Thre_L), (Thre_M), and (Thre_S) are stored in the threshold value storage section 14, the multilevel value output device 1 executes the multilevel value conversion process in a manner shown in FIG. 7.

During the multilevel value conversion process, first, in S00, the CPU 3 sets X=0 and Y=0 as initial settings for pixel location. It is noted that X is a coordinate value of a subject pixel (X,Y) in the horizontal-direction, while Y is a coordinate value of the subject pixel (X,Y) in the vertical-direction. It is also noted that X and Y satisfy the following inequalities:

$$X \leq X\_SIZE$$

$$Y \leq Y\_SIZE,$$

wherein X_SIZE is the horizontal size of an input image, that is, the total number of pixels arranged in the input image in the horizontal direction, and Y_SIZE is the vertical size of the input image, that is, the total number of pixels arranged in the input image in the vertical direction. In other words, X_SIZE indicates the total number of input data sets arranged in the horizontal direction, while Y_SIZE indicates the total number of input data sets arranged in the vertical direction.

Next, in S01, the CPU 3 reads, from the threshold value storage section 14, threshold values (Thre_L), (Thre_M), and (Thre_S) that correspond to the input value Input(X,Y) for the subject pixel (X,Y).

Next, in S02, the CPU 3 accumulates parts of errors ED(X, Y) that have been generated at already-processed nearby pixels (X−1,Y−1), (X,Y−1), (X+1,Y−1), and (x−1,Y). The CPU 3 executes this operation by using the weight coefficients mtr(X−1,Y−1), mtr(X,Y−1), mtr(X+1,Y−1), and mtr(X−1, Y) in the distribution matrix 30, and obtains the correction amount MTR(X,Y) for the present pixel (X,Y).

Then, in S03, the CPU 3 adds the correction amount MTR (X,Y) to the input value "Input(X,Y)" for the subject pixel (X,Y), thereby determining the corrected value "newdata(X, Y)".

In S04, the CPU 3 compares the corrected value "newdata (X,Y)" with threshold values (Thre_L), (Thre_M), and (Thre_S), that have been set in S01 for the present pixel (X,Y), in this order. If the corrected value newdata(X,Y) exceeds the large dot threshold value (Thre_L), medium dot threshold value (Thre_M), or small dot threshold value (Thre_S), the processing flow proceeds to S05.

In S05, if the corrected value newdata(X,Y) exceeds the large dot threshold value (Thre_L), the CPU 3 sets a large dot output level L (3) for the present pixel (X,Y). The CPU refers to the relative density value storage section 22, and reads out a large-dot relative density value Den_L (255) that corresponds to the large dot output level L (3). The CPU 3 calculates the difference between the corrected value newdata(X, Y) and the large-dot relative density value Den_L (255), and sets the difference as an error ED(X,Y). The CPU 3 stores the error value ED(X,Y) in the buffer 28.

If, on the other hand, the corrected value newdata(X,Y) is less than or equal to the large dot threshold value (Thre_L) but exceeds the medium dot threshold value (Thre_M), the CPU 3 sets a medium dot output level M (2) for the present pixel (X,Y). The CPU 3 refers to the relative density value storage section 22, and reads out a medium-dot relative density value Den_M (200) that corresponds to the medium dot output level M (2). The CPU 3 calculates the difference between the corrected value newdata(X,Y) and the medium-dot relative density value Den_M (200) and sets the difference as an error value ED(X,Y). The CPU 3 stores the error value ED(X,Y) in the buffer 28.

If the corrected value newdata(X,Y) is less than or equal to the medium dot threshold value (Thre_M) but exceeds the small dot threshold value (Thre_S) the CPU 3 sets a small dot output level S (1) for the present pixel (X,Y). The CPU 3 refers to the relative density value storage section 22, and reads out a small-dot relative density value Den_S (66) that corresponds to the small dot output level S (1). The CPU 3 calculates the difference between the corrected value newdata (X,Y) and the small-dot relative density value Den_S (66), and sets the difference as an error ED(X,Y). The CPU 3 stores the error value ED(X,Y) in the buffer 28.

Then, in S07, the CPU 3 assigns, to an output value outdata (X,Y), a quantized multilevel value Outlevel_L (3), outlevel_M (2), or Outlevel_S (1) that corresponds to the output dot level L, M, or S that has been set in S05. More specifically, the CPU 3 sets, to the output value outdata(X,Y), a quantized multilevel value Outlevel_L (3) if the large dot output level L has been set in S05. The CPU 3 sets, to output value Outdata (X,Y), a quantized multilevel value Outlevel_M (2) if the medium dot output level M has been set in S05. The CPU 3 sets, to output value outdata(X,Y), a quantized multilevel value Outlevel_S (1) if the small dot output level S has been set in S05.

If, on the other hand, the corrected value newdata(X,Y) is less than or equal to the small dot threshold value (Thre_S) (S04: NO), the CPU 3 stores the corrected value newdata(X, Y) as an error value ED(X,Y) in the buffer 28 (S06), and assigns the value of zero (0) to the output value Outdata(X,Y) (S08).

The CPU 3 outputs the output value Outdata(X,Y) obtained in S07 or S08 to the printer 2.

After S07 or S08 is executed, X is incremented in S09. If the value of X exceeds X_SIZE, X is set to 0 and Y is incremented.

The processing flow then returns to S01 and the above-described processing is repeated until the value of X exceeds X_SIZE and the value of Y exceeds Y_SIZE (while S10: YES). When the value of X exceeds X_SIZE and the value of Y exceeds Y_SIZE (S10: NO), it is known that processing has been completed for all the pixels, and therefore this routine ends.

It is noted that the printer 2 is of a type that can print images by using ink of several colors, such as cyan, magenta, yellow, and black. Accordingly, during the threshold value calculation process, calculation of the equations (1)-(14) are executed for all the input densities for each of all the inks, whereby threshold values (Thre_L) (Thre_M), and (Thre_S) are determined for all the input-value ranges A, B, C, and D for all the inks. Data of the thus determined threshold values (Thre_L), (Thre_M), and (Thre_S) are stored in the threshold value storage section 14. Thereafter, the multilevel value conversion process of FIG. 7 is executed for the entire image for each of all the colors.

Figure 3:
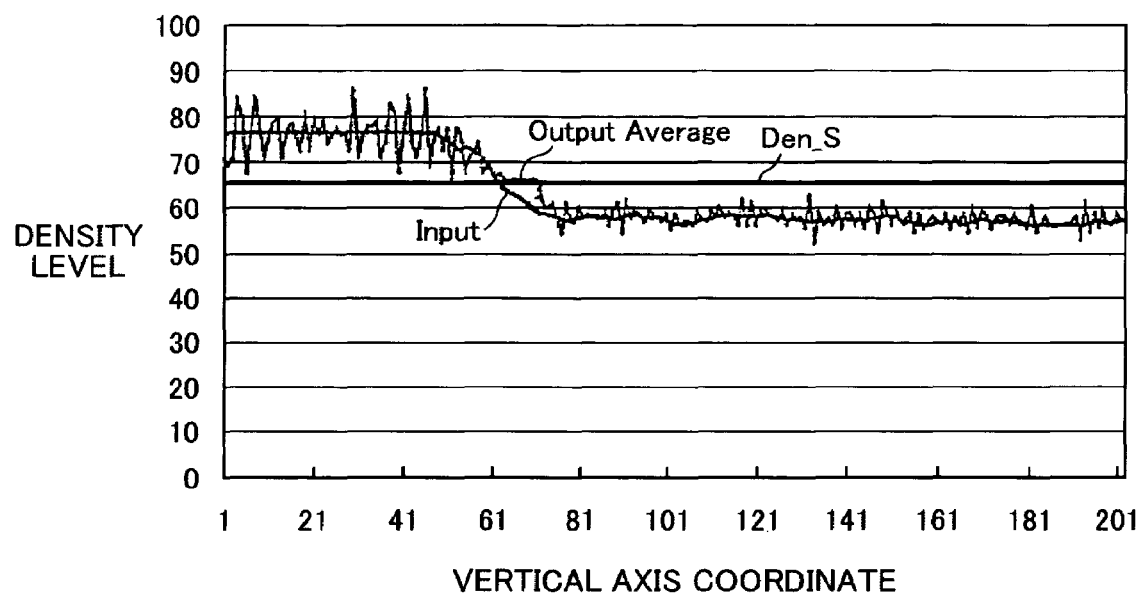
FIG. 3 is a graph showing how input values in an input gradation image are converted into output density values according to the conventional error-diffusion multilevel value conversion process.
Figure 4A:
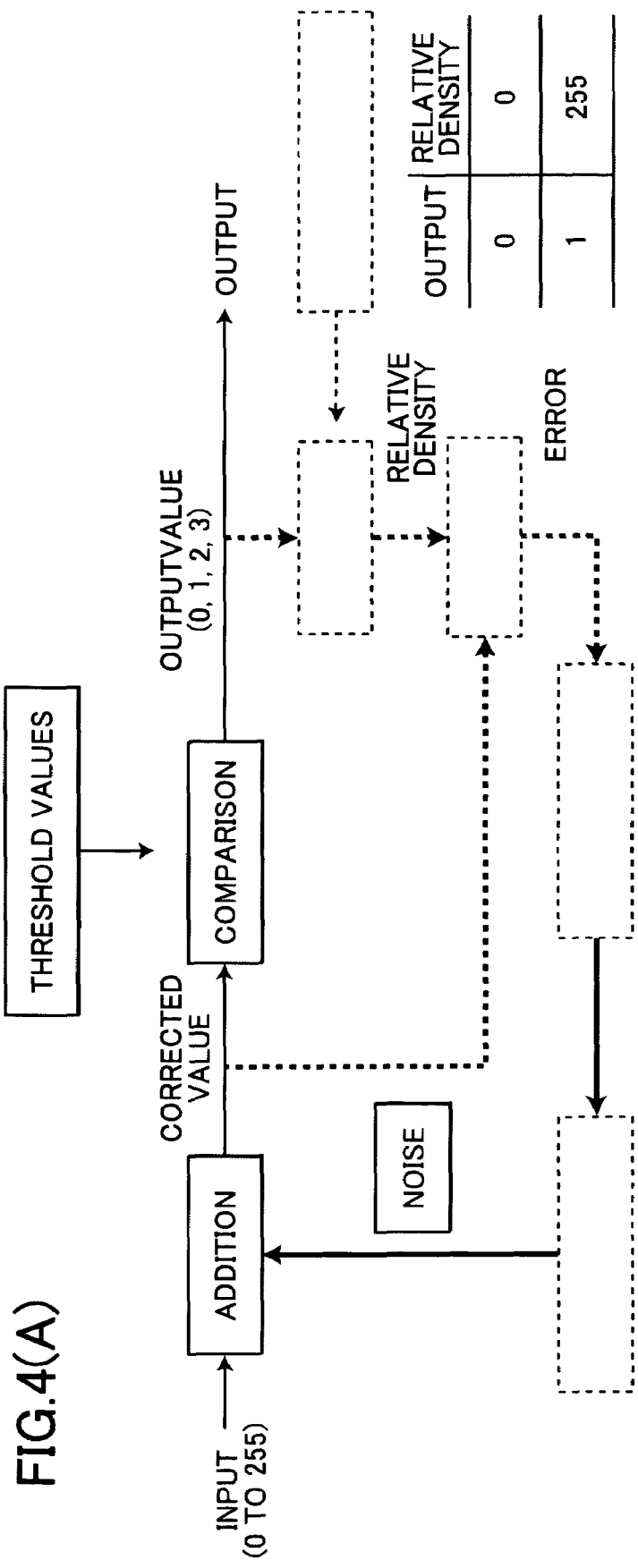
FIG. 4(A) is a functional block diagram of a conventional dithering type bi-level conversion process.
Figure 4B:
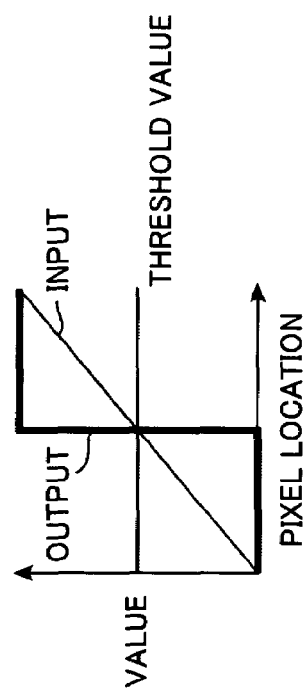
FIG. 4(B) is a graph showing how gradually-increased input values are converted into bi-level values if no noise is added during the conventional dithering bi-level conversion process.
Figure 5A:
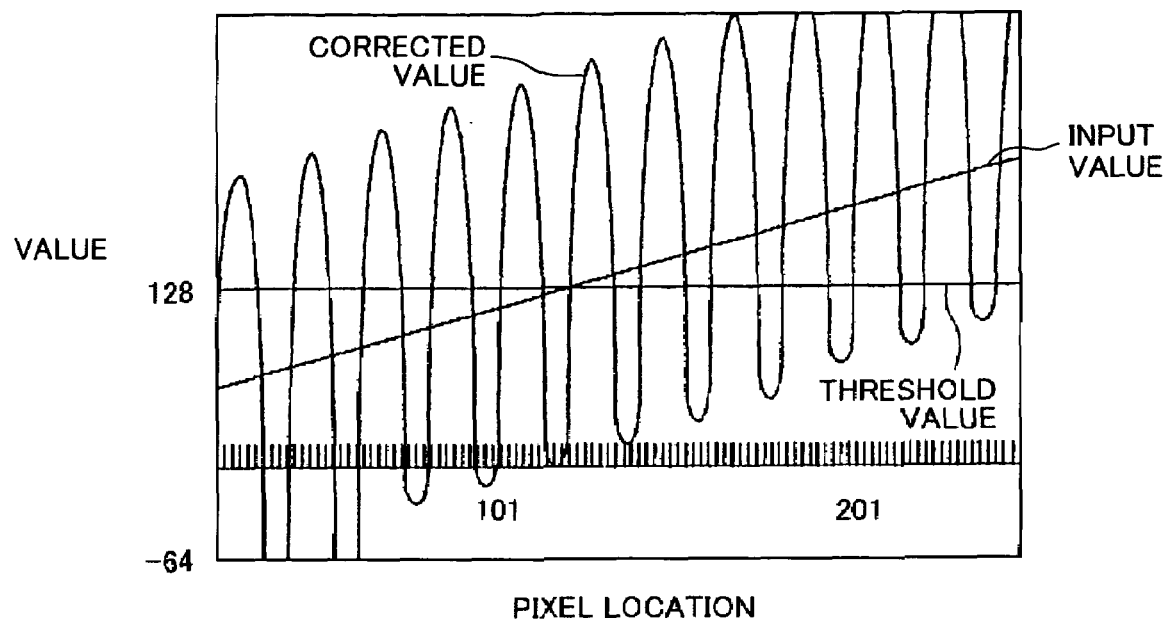
FIG. 5(A) is a graph showing how gradually-increased input values are corrected by sinusoidal wave noise into corrected values in the conventional dithering type bi-level conversion process.
Figure 5B:
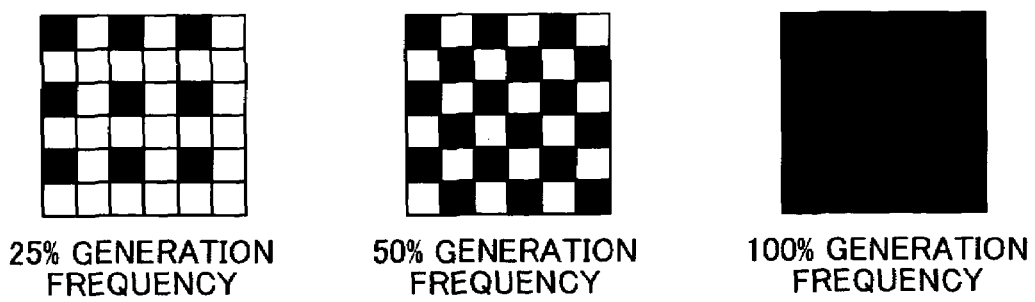
FIG. 5(B) shows how the conventional dithering type bi-level conversion process can reproduce various tones at macro level by changing the frequency at which one of the two density values is generated.
Figure 9:
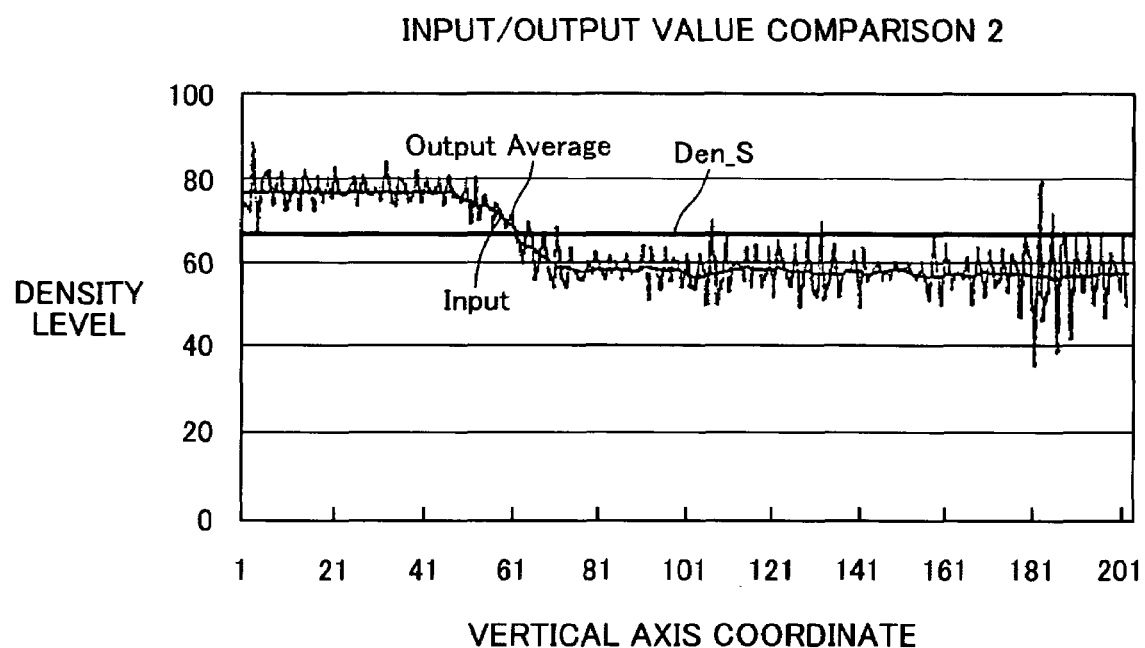
FIG. 9 is a graph showing how input values in an input gradation image are converted into output density values according to the multilevel value conversion process of the present embodiment.

The same input gradation image as defined by the input density value Input(X,Y) in FIG. 3 is subjected also to the multilevel value conversion process of the present embodiment. The density value Input(X,Y) at each pixel location (X, Y) in the input gradation image is converted into a multilevel output value Outdata(X,Y). An average-output-density "Average-output-density(X,Y)" is obtained at each pixel location (X,Y) by calculating an average of densities for several multilevel output values Outdata(X,Y) that are obtained at several pixels including the subject pixel (X,Y) and its adjacent peripheral pixels. FIG. 9 shows how the density value Input(X,Y) changes in the input gradation image along the y-coordinate direction and how the average-output-density value Average-output-density(X,Y) changes along the y-coordinate direction. It is noted that in FIG. 9, the horizontal axis indicates the y-coordinates of the pixel locations, while the vertical axis indicates how the values Input (X,Y) and Average-output-density(X,Y) change relative to the small dot relative density value Den_S (66).

As is clear from the graph in FIG. 9, the value "Average-output-density(X,Y)" tracks the value Input(X,Y) properly even in the area in which value Input(X,Y) is around the small dot relative density value Den_S. It is confirmed that the tone of the input gradation image is reproduced sufficiently well by the output values "Outdata (X,Y)".

It is noted that the input values Input(X,Y) at those pixels in the y-coordinate of about 61 are close to the small dot relative density value Den_S. The differences between the small dot relative density value Den_S and the input values Input(X,Y) are small. The error values ED(X,Y) (difference) between the small dot relative density value Den_S and the corrected values newdata(X,Y) become small. However, according to the present embodiment, for those pixels whose values Input (X,Y) are close to the small dot relative density value Den_S, the medium dot threshold value Thre_M is close to the small dot threshold value. Accordingly, the corrected value newdata (X,Y) can frequently exceed not only the small dot threshold value Thre_S but also the medium dot threshold value Thre_M, thereby allowing that the corrected value newdata (X,Y) is converted frequently not only into the small-dot output value (1) but also into the medium-dot output value (2). When the corrected value newdata(X,Y) is converted into the medium-dot output value (2), a large difference (error ED(X,Y)) will be produced between the medium dot relative density value Den_M and the corrected value newdata(X,Y). It is ensured that input values close to the small dot relative density value Den_S can be converted into not only the small-dot output value (1) but also into other various output values. It is possible to prevent the output values from being converged to the particular small-dot output value. It is possible to produce a pattern, in which a plurality of different kinds of dots are mixed together and no undesirable false contour is visually identified. It is possible to improve tone reproducibility.

Additionally, as the y-coordinate increases from about the value 41 to about the value 61, the input value gradually decreases toward the small dot relative density value Den_S. As shown in FIG. 8, as the input value gradually decreases toward the small-dot relative density value Den_S, the medium-dot threshold value Thre_M decreases gradually toward the small dot threshold value Thre_S. Accordingly, it is possible to attain high reproducibility even for the region of the y-coordinate of 1 to 61 where the input value is greater than the small dot relative density value Den_S.

Similarly, as the y-coordinate decreases from about the value 81 to about the value 61, the input value gradually increases toward the small dot relative density value Den_S. As shown in FIG. 8, as the input value gradually increases toward the small-dot relative density value Den_S, the small dot threshold value Thre_S increases gradually toward the medium-dot threshold value Thre_M. Accordingly, it is possible to attain high reproducibility even for the region of the y-coordinate of 61 to 81 where the input value is smaller than the small dot relative density value Den_S.

As described above, according to the present embodiment, when the input value becomes close to the medium dot relative density value (Den_M), the large dot threshold value (Thre_L) and medium dot threshold value (Thre_M) become close to each other. When the input value becomes equal to the medium dot relative density value (Den_M), the large dot threshold value (Thre_L) and the medium dot threshold value (Thre_M) become equal to each other. When the input value becomes close to the small dot relative density value (Den_S), the medium dot threshold value (Thre_M) and the small dot relative density value (Den_S) become close to each other. When the input value becomes equal to the small dot relative density value (Den_S), the medium dot threshold value (Thre_M) and the small dot relative density value (Den_S) become equal to each other.

Accordingly, even when the input value becomes close to the median dot relative density value (Den_M) and therefore the corrected value becomes also close to the medium dot relative density value (Den_M), the probability that the input value will be converted into the medium dot output value (2) is reduced. It is possible to prevent output values from being converged to the particular medium-dot output value. It is possible to properly reproduce an original image by distributing a plurality of different kinds of dots. No undesirable false contour will be visually identified.

Similarly, even when the input value becomes close to the small dot relative density value (Den_S) and therefore the corrected value becomes also close to the small dot relative density value (Den_S), the probability that the input value will be converted into the small dot output value (1) is reduced. It is possible to prevent output values from being converged to the particular small-dot output value. It is possible to properly reproduce an original image by distributing a plurality of different kinds of dots. No undesirable false contour will be visually identified.

In other words, even when the corrected value becomes equal to the relative density value Den_M or Den_S, it is possible to reduce the probability at which the corrected value is converted into an output value corresponding to the subject relative density value. There are consequently extremely few cases in which the error value becomes zero (0), thus making it possible to prevent degradation of tone reproducibility but to improve tone reproducibility.

Additionally, as the input value gradually decreases from a value greater than the relative density value Den_S toward the relative density value Den_S, the medium-dot threshold value Thre_M decreases gradually toward the small dot threshold value Thre_S. Accordingly, it is possible to attain high reproducibility even for an image region where the input value is greater than the small dot relative density value Den_S.

Similarly, as the input value gradually decreases from a value greater than the relative density value Den_M toward the relative density value Den_M, the large-dot threshold value Thre_L decreases gradually toward the medium-dot threshold value Thre_M. Accordingly, it is possible to attain high reproducibility even for an image region where the input value is greater than the medium dot relative density value Den_M.

Additionally, as the input value gradually increases from a value smaller than the relative density value Den_S toward the relative density value Den_S, the small-dot threshold value Thre_S increases gradually toward the medium dot threshold value Thre_M. Accordingly, it is possible to attain high reproducibility even for an image region where the input value is smaller than the small dot relative density value Den_S.

Similarly, as the input value gradually increases from a value smaller than the relative density value Den_M toward the relative density value Den_M, the medium-dot threshold value Thre_M increases gradually toward the large-dot threshold value Thre_L. Accordingly, it is possible to attain high reproducibility even for an image region where the input value is smaller than the medium dot relative density value Den_M.

<Modification>

It is possible to prevent degradation of tonality and to improve tone reproducibility with other than the above-described configuration, as long as it is possible to prevent the occurrence of a state in which the corrected value becomes equal to the relative density value, that is, a state in which the error value becomes equal to zero (0). It is possible to compensate for the difference between the 8-bit corrected value and the multilevel output value by properly distributing the error value between the corrected value and the relative density value to unprocessed pixels through an error feedback.

Figure 2:
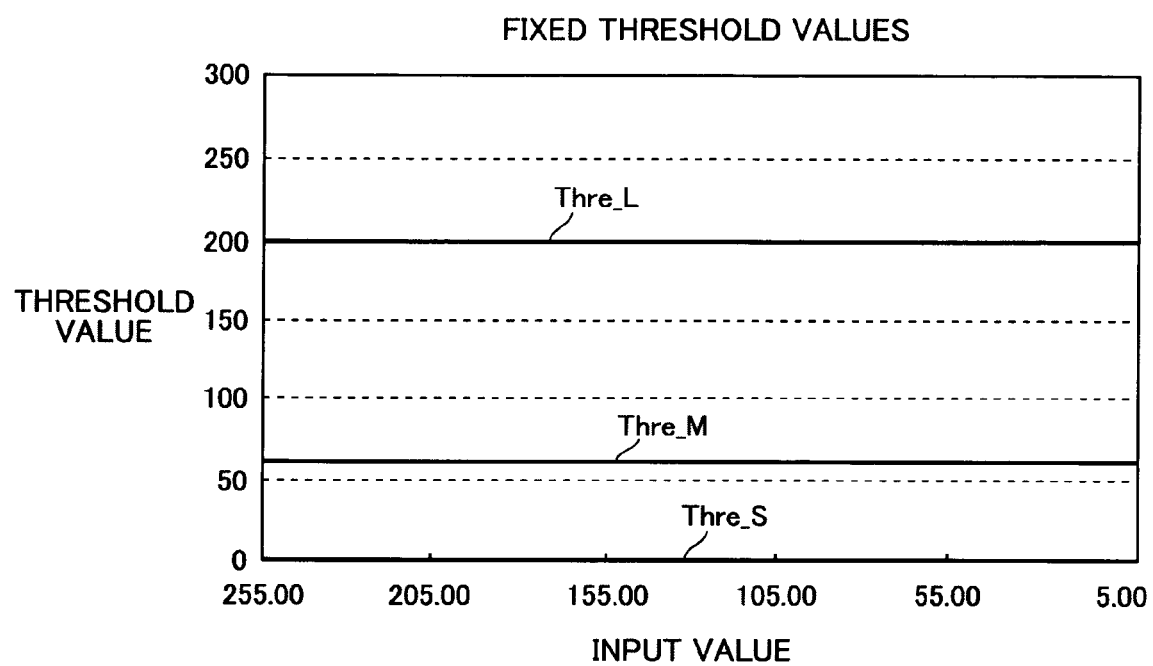
FIG. 2 is a graph showing how threshold values are fixed regardless of changes in the input value in the conversional error-diffusion multilevel value conversion process.
Figure 10:
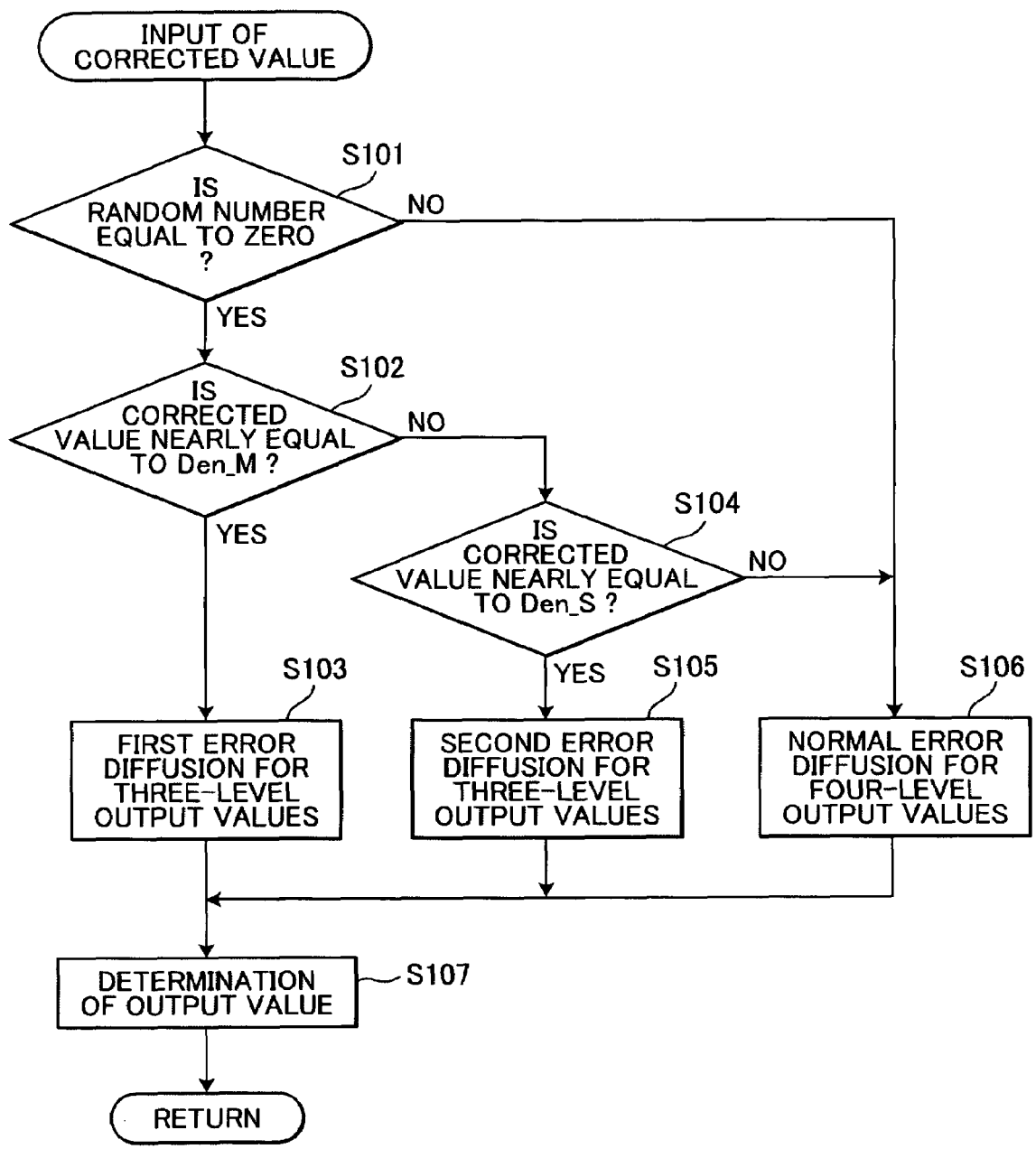
FIG. 10 is a flowchart of a modification of a part in the multilevel value conversion process of FIG. 7 according to the embodiment.

For example, the threshold values Thre_L, Thre_M, and Thre_S may be fixed to the values of 200, 66, and 0 regardless of the change of the input value as shown in FIG. 2 in the same manner as in the conventional error-diffusion multilevel value conversion process of FIG. 1. In other words, from the function of the multilevel value output device 1 of the present embodiment, the threshold calculation process 12 may be omitted, but the threshold values Thre_L of 200, Thre_M of 66, and Thre_S of 0 may be stored in the threshold value storage section 14. The multilevel value conversion process of FIG. 7 is modified by omitting the process of S01 and by replacing the processes of S04, S05, S06, S07, and S08 with the processes of S101-s107 shown in FIG. 10.

According to this modification, therefore, when the corrected value "newdata(X,Y)" is determined in S03 in FIG. 7, the process of S101 is first executed to generate a random number. It is noted that a table storing a plurality of random numbers may previously be set, and one random number may be retrieved from the table in S101.

In S101, the random number is judged as being equal to a predetermined number (zero (0), in this example). If the random number is different from zero (0) (no in S101), a normal error-diffusion conversion process for producing four-level output values is executed in S106.

During the normal error-diffusion conversion process of S106, the corrected value newdata(X,Y) is converted into either one of four different levels including: the large-dot output level (3), the medium-dot output level (2), the small-dot output level (1), and the non-dot output level (0) in the same manner as in the conventional error-diffusion conversion process of FIG. 1.

More specifically, if the corrected value "newdata(X,Y)" is greater than or equal to the large-dot threshold value Thre_L of 200, the corrected value "newdata(X,Y)" is converted into a large-dot output level L (3). The difference between the corrected value "newdata(X,Y)" and the large-dot relative density value Den_L is calculated as an error ED(X,Y) and is stored in the buffer 28.

On the other hand, if the corrected value "newdata(X,Y)" is smaller than the large-dot threshold value Thre_L of 200 but greater than or equal to the medium-dot threshold value Thre_M of 66, the corrected value "newdata(X,Y)" is converted into a medium-dot output level M (2). The difference between the corrected value "newdata(X,Y)" and the medium-dot relative density value Den_M is calculated as an error ED (X,Y) and is stored in the buffer 28.

On the other hand, if the corrected value "newdata(X,Y)" is smaller than the medium-dot threshold value Thre_M of 66 but greater than or equal to the small-dot threshold value Thre_S of 0, the corrected value "newdata(X,Y)" is converted into a small-dot output level S (1). The difference between the corrected value "newdata (X,Y)" and the small-dot relative density value Den_S is calculated as an error ED(X,Y) and is stored in the buffer 28.

On the other hand, if the corrected value "newdata(X,Y)" is smaller than the small-dot threshold value Thre_S of 0, the corrected value "newdata(X,Y)" is converted into a non-dot output level N(0). The corrected value "newdata(X,Y)" is set as an error ED(X,Y) and is stored in the buffer 28.

When the process of S106 is completed, the process proceeds to S107.

On the other hand, when the random number is equal to zero (0) (yes in S101), the process proceeds to S102. In s102, it is judged whether or not the corrected value newdata(X,Y) is close to the medium-dot relative density value Den_M (66). In S102, it is judged whether or not the absolute value of a difference between the corrected value newdata(X,Y) and the medium-dot relative density value Den_M (66) is in a predetermined range (a range of 0 to 3, in this example). If the difference absolute is in the range of 0 to 3, it is determined that the corrected value newdata(X,Y) is close to the medium-dot relative density value Den_M (66) (yes in S102), and the process proceeds to S103, where a first error-diffusion conversion process for determining three-level output values is executed.

During the first error-diffusion conversion process of s103, the corrected value newdata(X,Y) is converted into either one of the three different output levels including: the large-dot output level L(3), the small-dot output level S(1), and the non-dot output level N(O) in a manner described below.

If the corrected value "newdata(X,Y)" is greater than or equal to the large-dot threshold value Thre_L of 200, the corrected value "newdata(X,Y)" is converted into a large-dot output level L (3). The difference between the corrected value "newdata(X,Y)" and the large-dot relative density value Den_L is calculated as an error ED(X,Y) and is stored in the buffer 28.

On the other hand, if the corrected value "newdata(X,Y)" is smaller than the large-dot threshold value Thre_L of 200 but greater than or equal to the small-dot threshold value Thre_S of 0, the corrected value "newdata(X,Y)" is converted into a small-dot output level S (1). The difference between the corrected value "newdata(X,Y)" and the small-dot relative density value Den_S is calculated as an error ED(X,Y) and is stored in the buffer 28.

On the other hand, if the corrected value "newdata(X,Y)" is smaller than the small-dot threshold value Thre_S of 0, the corrected value "newdata(X,Y)" is converted into a non-dot output level N (0). The corrected value "newdata(X,Y)" is determined as an error ED(X,Y) and is stored in the buffer 28.

In this way, during the first error-diffusion conversion process, the input value Input(X,Y) close to the medium-dot relative density value Den_M is prevented from being converted into a medium-dot output level M(2).

When the process of S103 is completed, the process proceeds to S107.

On the other hand, if the difference absolute between the corrected value newdata(X,Y) and the medium-dot relative density value Den_M (66) is greater than 3, it is determined that the corrected value newdata(X,Y) is not close to the medium-dot relative density value Den_M (66) (no in S102), and the process proceeds to S104.

In S104, it is further judged whether or not the corrected value newdata(X,Y) is close to the small-dot relative density value Den_S (0). In S104, it is judged whether or not the absolute value of a difference between the corrected value newdata(X,Y) and the small-dot relative density value Den_S (0) is in the predetermined range (0 to 3, in this example). If the difference absolute is in the range of 0 to 3, it is determined that the corrected value newdata(X,Y) is close to the small-dot relative density value Den_S (0) (yes in S104), and the process proceeds to S105. In S105, a second error-diffusion conversion process for determining three-level output values is executed.

During the second error-diffusion conversion process of S105, the corrected value newdata(X,Y) is converted into either one of the three different output levels including: the large-dot output level L(3), the medium-dot output level M(2), and the non-dot output level N(0) in a manner described below.

If the corrected value "newdata(X,Y)" is greater than or equal to the large-dot threshold value Thre_L of 200, the corrected value "newdata(X,Y)" is converted into a large-dot output level L (3). The difference between the corrected value "newdata(X,Y)" and the large-dot relative density value Den_L is calculated as an error ED(X,Y) and is stored in the buffer 28.

On the other hand, if the corrected value "newdata(X,Y)" is smaller than the large-dot threshold value Thre_L of 200 but greater than or equal to the medium-dot threshold value Thre_M of 66, the corrected value "newdata(X,Y)" is converted into a medium-dot output level M(2). The difference between the corrected value "newdata(X,Y)" and the medium-dot relative density value Den_M is calculated as an error ED(X,Y) and is stored in the buffer 28.

On the other hand, if the corrected value "newdata(X,Y)" is smaller than the medium-dot threshold value Thre_M of 66, the corrected value "newdata(X,Y)" is converted into a non-dot output level N(0). The corrected value "newdata(X,Y)" is determined as an error ED(X,Y) and is stored in the buffer 28.

In this way, during the second error-diffusion conversion process, the input value Input(X,Y) close to the small-dot relative density value Den_S is prevented from being converted into a small-dot output level S(1).

When the process of S105 is completed, the process proceeds to S107.

On the other hand, if the difference absolute between the corrected value newdata(X,Y) and the small-dot relative density value Den_S (0) is greater than 3, it is determined that the corrected value newdata(X,Y) is not close to the small-dot relative density value Den_S (0) (no in S104), and the process proceeds to S106.

In S107, the output value Outdata(X,Y) is set to a quantized multilevel value that corresponds to the output level that has been determined in S103, S105, or S106.

More specifically, the output value Outdata(X,Y) is set to an Outlevel_L (3) if the large-dot output level L(3) has been set in S103, S105, or S106. The output value outdata(X,Y) is set to an Outlevel_M (2) if the medium-dot output level M(2) has been set in S105 or S106. The output value Outdata(X,Y) is set to an Outlevel_S (1) if the small-dot output level S(1) has been set in S103 or S106. The output value outdata(X,Y) is set to zero (0) if the non-dot output level N(0) has been set in S103, S105, or S106.

When the process of S107 is completed, the process proceeds to S09 in FIG. 7.

In this way, according to the present modification, if the random number is different from zero or if the corrected value "newdata(X,Y)" is not close to the medium-, or small-dot relative value Den_M or Den_S, the normal error-diffusion conversion process is executed in S106 in the same manner as in the conventional error-diffusion conversion process.

On the other hand, if the random number is equal to zero and if the corrected value "newdata(X,Y)" is close to the medium-dot relative density value Den_M, the first special error-diffusion conversion process is executed not to convert the corrected value "newdata(X,Y)" into the medium-dot output value (2) that corresponds to the medium-dot relative density value Den_M. It is therefore possible to prevent the error value ED(X,Y) from being close to zero.

Similarly, if the random number is equal to zero and if the corrected value "newdata(X,Y)" is close to the small-dot relative density value Den_S, the second special error-diffusion conversion process is executed not to convert the corrected value "newdata(X,Y)" into the small-dot output value (1) that corresponds to the small-dot relative density value Den_S. It is therefore possible to prevent the error value ED(X,Y) from being close to zero.

Thus, it is possible to reduce the probability, at which the corrected values "newdata(X,Y)" close to the medium-dot relative density value Den_M are converted into medium dots and the probability at which the corrected values "newdata(X,Y)" close to the small-dot relative density value Den_S are converted into small dots. It is ensured that error values ED(X,Y) will vary largely.

In the above description, in order to know in S102 or S104 whether or not the corrected value newdata(X,Y) is close to the corresponding relative density value Den_M (66) or Den_S (0), it is judged whether or not the absolute of the difference between the corrected value newdata(X,Y) and the corresponding relative density value Den_M (66) or Den_S (0) is in the range of 0 to 3. However, it may be judged whether or not the difference absolute is in another range that is defined between 0 and a value other than 3. The range may be determined previously through experimentation or the like so that the range will be appropriate for the specification of the multilevel output device 1 and the printer 2.

As described above, according to the present modification, only when the random number is not equal to the predetermined value (0, in this example), the corrected value newdata (X,Y) close to the medium- or small-dot relative density value is allowed to be converted into the corresponding medium- or small-dot multilevel output value. On the other hand, then the random number is equal to the predetermined value (0), the corrected value newdata (X,Y) close to the medium- or small-dot relative density value is prohibited from being converted into the corresponding medium- or small-dot multilevel output value, but is converted into an output value other than the corresponding medium- or small-dot multilevel output value. It is possible to improve tone reproducibility by preventing the error amount to be fed back by the error-diffusion feedback mechanism from being reduced.

By varying at least one of the size of the range of the random numbers possibly generated in S101 and the predetermined value (0, in the above description) used as a reference during the judgment in S101, it is possible to freely adjust the frequency, at which the corrected values newdata (X,Y) close to the medium- or small-dot relative density value will be converted into the corresponding medium- or small-dot multilevel output values.

In this way, according to this modification, when the corrected value is close to some relative density value, the frequency, at which the corrected value will be converted into an output value that corresponds to the subject relative density value, is reduced. There are consequently extremely few cases in which the error value becomes zero (0) even when the corrected value becomes close to the relative density value. It is possible to prevent degradation of tonality and to improve tone reproducibility.

It is noted that in order to reduce the frequency, at which the input value close to some relative density value is converted into the corresponding output value, it may be possible to always prevent the input value close to some relative density value from being converted into the corresponding output value. That is, the process of S101 may be omitted from the process of FIG. 10.

While the invention has been described in detail with reference to the specific embodiment thereof, it would be apparent to those skilled in the art that various changes and modifications may be made therein without departing from the spirit of the invention.

For example, in the above-described embodiment, when the input value is equal to the medium dot relative density value (Den_M), the large dot threshold value (Thre_L) and medium dot threshold value (Thre_M) are set to the same value. However, it is unnecessary to set the large dot threshold value (Thre_L) and medium dot threshold value (Thre_M) to the same value. It is sufficient that the large dot threshold value (Thre_L) and the medium dot threshold value (Thre_M) will become close toward each other as the input value becomes close toward the medium dot relative density value (Den_M).

Similarly, in the above-described embodiment, when the input value is equal to the small dot relative density value (Den_S), the medium dot threshold value (Thre_M) and the small dot threshold value (Thre_S) are set to the same value. However, it is unnecessary to set the threshold values (Thre_M) and (Thre_S) to the same value. It is sufficient that the threshold values (Thre_M) and (Thre_S) will become close to each other as the input value becomes close to the small dot relative density value (Den_S).

It is, however, preferable to set the large dot threshold value (Thre_L) and the medium dot threshold value (Thre_M) so that the threshold values (Thre_L) and (Thre_M) become close to each other as the input value becomes close to the medium dot relative density value (Den_M), and the threshold values (Thre_L) and (Thre_M) become equal to each other when the absolute value of a difference between the input value and the medium dot relative density value (Den_M) fails in a predetermined range. It is also preferable to set the medium dot threshold value (Thre_M) and the small dot threshold value (Thre_S) so that the threshold values (Thre_M) and (Thre_S) become close to each Other as the input value becomes close to the small dot relative density value (Den_S), and the threshold values (Thre_M) and (Thre_S) become equal to each other when the absolute value of a difference between the input value and the small dot relative density value (Den_S) falls in the predetermined range. When the input value and the relative density value are represented by eight-bit data to indicate 0 to 255 different values, for example, this range is preferably set to 0 to about 3. However, this range may be determined previously through experimentation or the like so that the range is appropriate for the specification of the multilevel output device 1 and the printer 2.

In the above-described embodiment, the threshold values are set so that the large dot threshold value (Thre_L) changes linearly in the range A, the medium dot threshold value (Thre_M) changes linearly in the range B, and the small dot threshold value (Thre_S) changes linearly in the range C.

However, it is unnecessary that these threshold values change linearly in the corresponding ranges, as long as they change smoothly in accordance with changes in the input value in the corresponding ranges. It is sufficient that these threshold values change in the corresponding ranges without any stepped changes or any inflection points when the threshold values change in accordance with changes in the input value within the corresponding ranges.

In the above-described embodiment, the multilevel value output device 1 converts an 8-bit input value into a four-level output value 0, 1, 2, or 3. However, the multilevel value output device 1 may be modified to convert the input value into a three-level output value 0, 1, or 2, or five-or-more level output values 0, 1, 2, 3, or 4 or more. When the multilevel value output device 1 is modified so as to convert the input value into a three-level output values 0, 1, or 2, three relative density values are stored in the relative density storage section 22 in one-to-one correspondence with the three-level output values 0, 1, and 2. The three relative density values have been determined by normalizing the three-level output values 0, 1, and 2 based on the maximum density (255) that corresponds to the highest output value (2). Two threshold values (higher threshold value and lower threshold value) are calculated during the threshold calculation process 12 so that the two threshold values become close to each other when the input value becomes close to a relative density value corresponding to the output value (1). During the conversion process 20, the corrected value is converted into a highest output value (2) when the corrected value is greater than the higher threshold value, the corrected value is converted into a medium output value (1) when the corrected value is smaller than or equal to the higher threshold value but is greater than the lower threshold value, and the corrected value is converted into a smallest output value (0) when the corrected value is smaller than or equal to the lower threshold value.

In the above-described embodiment, the multilevel value output device 1 executes both of the threshold calculation process to calculate the equations (1)-(14) to determine the threshold values Thre_L, Thre_M, and Thre_S and the multilevel value conversion process of FIG. 7. However, the multilevel value output device 1 may be prestored with data of the threshold values Thre_L, Thre_M, and Thre_S defined by the equations (1)-(14). Or, data of the printer driver program including the multilevel value conversion program of FIG. 7 together with data of the threshold values Thre_L, Thre_M, and Thre_S defined by the equations (1)-(14) may be originally stored in some data recording medium 8, such as a flexible disk, a CD-ROM, or a magnetooptical disk. Data of the printer driver program including the multilevel value conversion program of FIG. 7 and the data of the threshold values Thre_L, Thre_X, and Thre_S may be installed in the hard disk 6 from the data recording medium 8. In this case, the data of the threshold values Thre_L, Thre_M, and Thre_S is directly stored in the threshold storage section 14. In this case, the multilevel value output device 1 does not execute the threshold calculation process 12, but executes the multilevel value conversion process of FIG. 7 only.

Data of the large-, medium-, small-, and non-dot relative density values Den_L, Den_M, Den_S, zero (0) may be originally stored in the data recording medium 8 together with the multilevel value conversion program of FIG. 7 in the printer driver program. The data of the relative density values Den_L, Den_M, Den_S, zero (0) may be installed from the data recording medium 8 to the relative density value storage section 22.

In the above-described embodiment, the computer 1 installed with data of the multilevel value conversion program of FIG. 7 functions as the multilevel value output device 1. However, the multilevel value output device 1 can be configured by hardware.

Furthermore, it is also possible to install data of the multilevel value conversion program of FIG. 7 in a computer incorporated in the printer 2, thereby letting the printer 2 function as a multilevel value output device.

During the multilevel value conversion process in the above-described embodiment, in order to compare the corrected value with some threshold value, it is judged whether or not the corrected value is greater than some threshold value. When the corrected value is greater than some threshold value, the corrected value is converted into one output value. When the corrected value is smaller than or equal to the threshold value, the corrected value is converted into another output level. However, the multilevel value conversion process of the embodiment can be modified to judge whether or not the corrected value is greater than or equal to some threshold value. In such a case, when the corrected value is greater than or equal to some threshold value, the corrected value is converted into one output value. When the corrected value is smaller than the threshold value, the corrected value is converted into another output level.

During the multilevel value conversion process in the above-described modification, in order to compare the corrected value with some threshold value, it is judged whether or not the corrected value is greater than or equal to some threshold value. When the corrected value is greater than or equal to some threshold value, the corrected value is converted into one output value. When the corrected value is smaller than the threshold value, the corrected value is converted into another output level. However, the multilevel value conversion process of the modification can be modified to judge whether or not the corrected value is greater than some threshold value. In such a case, when the corrected value is greater than some threshold value, the corrected value is converted into one output value. When the corrected value is smaller than or equal to the threshold value, the corrected value is converted into another output level.

What is claimed is:

1. A multilevel value output device, comprising:
   a relative density value storage portion that prestores therein at least three relative density values for at least three multilevel output values in one-to-one correspondence with each other, the at least three relative density values being defined dependently on a predetermined maximum density that is defined for a highest relative density value among the at least three relative density values;
   an input portion that receives an input value indicative of density of a pixel in an input image;
   a corrected value calculation portion that calculates a corrected value by adding to the input value at least a part of an error value that has been generated by at least one pixel near to the subject pixel;
   an output value generation portion that compares the corrected value with at least one of the at least two threshold values, that converts the corrected value into one of the at least three multilevel values based on the compared results, and that outputs a resultant multilevel output value, the output value generation portion referring to the threshold value storage portion and setting one relative density value that corresponds to the output value, the output value generation portion calculating a difference between the corrected value and the relative density value and setting the calculated result as an error value for the subject pixel; and an output-value generation control portion that, when the corrected value is close to at least one of the at least three relative density values, reduces a frequency, at which the output value generation portion converts the corrected value into one multilevel output value that corresponds to the subject relative density value, thereby reducing a frequency at which the error value for the subject pixel becomes close to zero.

2. A multilevel value output device as claimed in claim 1, wherein the output-value generation control portion includes:
a corrected-value judging portion judging whether or not the corrected value is close to any of the at least one of the at least three relative density values; and
a selective control portion that controls, when the corrected value is not close to any of the at least one of relative density value, the output value generation portion to convert the corrected value into one multilevel output value based on the compared results, the selective control portion controlling, when the corrected value is close to one of the at least one relative density value, the output value generation portion to fail to convert the corrected value into the one multilevel output value that corresponds to the subject relative density value, thereby preventing the output value generation portion from calculating the error value for the subject pixel as being close to zero.

3. A multilevel value output device as claimed in claim 2, wherein when the corrected value is close to one of the at least one relative density value, the selective control portion controls the output value generation portion to convert the corrected value into a multilevel output value other than the one multilevel output value that corresponds to the subject relative density value.

4. A multilevel value output device as claimed in claim 2, wherein the output-value generation control portion further includes:
a random number generating portion generating a random number when the corrected value calculation portion calculates the corrected value for the subject pixel; and
a random number judging portion judging whether or not the random number is equal to a predetermined number,
wherein when the random number is equal to the predetermined number, the corrected-value judging portion executes its judging operation and the selective control portion executes its selective control operation, and when the random number is not equal to the predetermined number, the corrected-value judging portion fails to execute its judging operation and the selective control portion controls the output value generation portion to convert the corrected value into one multilevel output value based on the compared results.

5. A multilevel value output device as claimed in claim 2, wherein the output-value generation portion includes a threshold setting portion that sets the at least two threshold values in a manner that the at least two threshold values are maintained as being fixed regardless of changes of the input value.

6. A multilevel value output device as claimed in claim 1, wherein the output value generation portion converts the corrected value into one multilevel output value that corresponds to one relative density value when the corrected value is between two of the at least two threshold values,
wherein the output-value generation control portion includes a threshold setting portion that sets, upon receipt of the input value, the two threshold values in a manner that the two threshold values become close to each other when the input value becomes close to the one relative density value.

7. A multilevel value output device as claimed in claim 6, wherein the two threshold values include a higher threshold value and a lower threshold value that is lower than the higher threshold value.

8. A multilevel value output device as claimed in claim 7, wherein the threshold setting portion sets the higher threshold value and the lower threshold value in a manner that as the input value decreases in a higher range defined between the one relative density value and another relative density value that is higher than the one relative density value toward the one relative density value, the lower threshold value is maintained as fixed and the higher threshold value decreases smoothly toward the lower threshold value.

9. A multilevel value output device as claimed in claim 8, wherein the lower threshold value is maintained as fixed to an intermediate value between the one relative density value and still another relative density value lower than the one relative density value.

10. A multilevel value output device as claimed in claim 7, wherein the threshold setting portion sets the higher threshold value and the lower threshold value in a manner that as the input value increases in a lower range defined between the one relative density value and another relative density value that is lower than the one relative density value toward the one relative density value, the higher threshold value is maintained as fixed and the lower threshold value increases smoothly toward the higher threshold value.

11. A multilevel value output device as claimed in claim 10, wherein the higher threshold value is maintained as fixed to an intermediate value between the at least one relative density value and the another relative density value lower than the one relative density value.

12. A multilevel value output device as claimed in claim 6, wherein the at least three multilevel output values include a highest multilevel output value, a second highest multilevel output value lower than the highest multilevel output value, a third highest multilevel output value lower than the second highest multilevel output value, and a lowest multilevel output value lower than the third highest multilevel output value, and
wherein the at least three relative density values include a highest relative density value, a second highest relative density value lower than the highest relative density value, a third highest relative density value lower than the second highest relative density value, and a lowest relative density value lower than the third highest relative density value, the relative density value storage portion storing the highest, second highest, third highest, and fourth highest relative density values in one-to-one correspondence with the highest, second highest, third highest, and lowest multilevel output values, respectively,
wherein the threshold setting portion sets three threshold values that include a highest threshold value, a second highest threshold value lower than or equal to the highest threshold value, and a lowest threshold value lower than or equal to the second highest threshold value,
wherein the output value generation portion outputs the highest multilevel output value when the corrected value is greater than the highest threshold value, outputs the second highest multilevel output value when the corrected value is between the highest threshold value and the second highest threshold value, outputs the third highest multilevel output value when the corrected value is between the second highest threshold value and the third highest threshold value, and outputs the lowest multilevel output value when the corrected value is smaller than the lowest threshold value, and wherein the threshold setting portion sets the highest threshold value and the second highest threshold value in a manner that the highest threshold value and the second highest threshold value become close to each other when the input value becomes close to the second highest relative density value, and sets the second highest threshold value and the third highest threshold value in a manner that the second highest threshold value and the third highest threshold value become close to each other when the input value becomes close to the third highest relative density value.

13. A multilevel value output device as claimed in claim 12, wherein the threshold setting portion sets the highest, second highest, and third highest threshold values in a manner that as the input value decreases in a highest range defined between the highest relative density value and the second highest relative density value from the highest relative density value toward the second highest relative density value, the highest threshold value decreases smoothly from the highest relative density toward a higher intermediate value between the second highest relative density value and the third highest relative density value, the second highest threshold value is maintained as fixed to the higher intermediate value, and the third highest threshold value is maintained as fixed to a lower intermediate value between the third highest relative density value and the lowest relative density value, as the input value decreases in a second highest range defined between the second highest relative density value and the third highest relative density value from the second highest relative density value toward the third highest relative density value, the highest threshold value is maintained as fixed to the higher intermediate value, the second highest threshold value decreases smoothly from the higher intermediate value toward the lower intermediate value, and the third highest threshold value is maintained as fixed to the lower intermediate value, as the input value decreases in a third highest range defined between the third highest relative density value and the lowest relative density value from the third highest relative density value toward the lowest relative density value, the highest threshold value is maintained as fixed to the higher intermediate value, the second highest threshold value is maintained as fixed to the lower intermediate value, the third highest threshold value decreases smoothly from the lower intermediate value toward the lowest relative density value, and as the input value changes in a lowest range defined smaller than or equal to the lowest relative density value, the highest threshold value is maintained as fixed to the higher intermediate value, the second highest threshold value is maintained as fixed to the lower intermediate value, and the third highest threshold value is maintained as fixed to the lowest relative density value.

14. A multilevel value output device, comprising:

a relative density value storage portion that prestores therein at least three relative density values for at least three multilevel output values in one-to-one correspondence with each other, the at least three relative density values being defined by normalizing the at least three multilevel output values based on a predetermined maximum density that is defined for a highest relative density value among the at least three relative density values, the at least three relative density values including a middle relative density value, a higher relative density value higher than the middle relative density value, and a lower relative density value lower than the middle relative density value, the at least three multilevel output values including a middle multilevel output value, a higher multilevel output value higher than the middle multilevel output value, and a lower multilevel output value lower than the middle multilevel output value, the higher, middle, and lower relative density values corresponding to the higher, middle, and lower multilevel output values, respectively;

an input portion that receives an input value indicative of density of a pixel in an input image;

a corrected value calculation portion that calculates a corrected value by adding to the input value at least a part of an error value that has been generated by at least one pixel near to the subject pixel;

an output value generation portion that compares the corrected value with at least one of the at least two threshold values, the at least two threshold values including a higher threshold value and a lower threshold value that is lower than the higher threshold value, the output value generation portion converting the corrected value into one of the at least three multilevel values based on the compared results and outputting the resultant one multilevel output value, the output value generation portion converting the corrected value into the higher multilevel output value when the corrected value is greater than the higher threshold value, the output value generation portion converting the corrected value into the middle multilevel output value when the corrected value is between the higher threshold value and the lower threshold value, the output value generation portion converting the corrected value into the lower multilevel output value when the corrected value is smaller than the lower threshold value;

a relative density setting portion that refers to the threshold value storage portion and that sets one relative density value that corresponds to the multilevel output value generated by the output value generation portion;

an error value calculation portion that calculates a difference between the corrected value and the relative density value set by the relative density setting portion, and that sets the calculated result as an error value for the subject pixel; and a threshold setting portion that modifies, upon receipt of the input value, both the higher and lower threshold values in a manner that both the higher and lower threshold values become closer to each other when the input value becomes close to the middle relative density value.

15. A multilevel value output device as claimed in claim 14, wherein the threshold setting portion sets the higher and lower threshold values in a manner that as the input value decreases from the higher relative density value toward the middle relative density value, the lower threshold value is maintained fixed while the higher threshold value decreases smoothly toward the lower threshold value.

16. A multilevel value output device as claimed in claim 15, wherein the threshold setting portion sets the higher and lower threshold values in a manner that as the input value decreases from the higher relative density value toward the middle relative density value, the lower threshold value is maintained fixed to an intermediate value between the middle relative density value and the lower relative density value while the higher threshold value decreases smoothly toward the intermediate value.

17. A multilevel value output device as claimed in claim 14, wherein the threshold setting portion sets the higher and lower threshold values in a manner that as the input value increases from the lower relative density value toward the middle relative density value, the higher threshold value is maintained fixed while the lower threshold value increases smoothly toward the higher threshold value.

18. A multilevel value output device as claimed in claim 17, wherein the threshold setting portion sets the higher and lower threshold values in a manner that as the input value increases from the lower relative density value toward the middle relative density value, the higher threshold value is maintained fixed to an intermediate value between the middle relative density value and the lower relative density value while the lower threshold value increases smoothly toward the intermediate value.

19. A multilevel value output method using a relative density value storage portion that prestores therein at least three relative density values for at least three multilevel output values in one-to-one correspondence with each other, the at least three relative density values being defined dependently on a predetermined maximum density that is defined for a highest relative density value among the at least three relative density values, the method comprising:
  receiving an input value indicative of density of a pixel in an input image;
  calculating a corrected value by adding to the input value at least a part of an error value that has been generated by at least one pixel near to the subject pixel;
  comparing the corrected value with at least one of the at least two threshold values, converting the corrected value into one of the at least three multilevel values based on the compared results, outputting a resultant multilevel output value, referring to the threshold value storage portion, setting one relative density value that corresponds to the output value, calculating a difference between the corrected value and the relative density value, and setting the calculated result as an error value for the subject pixel; and
  reducing, when the corrected value is close to at least one of the at least three relative density values, a frequency, at which the corrected value is converted into one multilevel output value that corresponds to the subject relative density value, thereby reducing a frequency at which the error value for the subject pixel becomes close to zero.

20. A multilevel value output method using a relative density value storage portion that prestores therein at least three relative density values for at least three multilevel output values in one-to-one correspondence with each other, the at least three relative density values being defined by normalizing the at least three multilevel output values based on a predetermined maximum density that is defined for a highest relative density value among the at least three relative density values, the at least three relative density values including a middle relative density value, a higher relative density value higher than the middle relative density value, and a lower relative density value lower than the middle relative density value, the at least three multilevel output values including a middle multilevel output value, a higher multilevel output value higher than the middle multilevel output value, and a lower multilevel output value lower than the middle multilevel output value, the higher, middle, and lower relative density values corresponding to the higher, middle, and lower multilevel output values, respectively, the method comprising:
  receiving an input value indicative of density of a pixel in an input image;
  calculating a corrected value by adding to the input value at least a part of an error value that has been generated by at least one pixel near to the subject pixel;
  comparing the corrected value with at least one of the at least two threshold values, the at least two threshold values including a higher threshold value and a lower threshold value that is lower than the higher threshold value, thereby converting the corrected value into one of the at least three multilevel values based on the compared results and outputting the resultant one multilevel output value, the comparing step converting the corrected value into the higher multilevel output value when the corrected value is greater than the higher threshold value, the comparing step converting the corrected value into the middle multilevel output value when the corrected value is between the higher threshold value and the lower threshold value, the comparing step converting the corrected value into the lower multilevel output value when the corrected value is smaller than the lower threshold value;
  referring to the threshold value storage portion and setting one relative density value that corresponds to the multilevel output value generated;
  calculating a difference between the corrected value and the set relative density value, and setting the calculated result as an error value for the subject pixel; and
  modifying, upon receipt of the input value, both the higher and lower threshold values in a manner that both the higher and lower threshold values become closer to each other when the input value becomes close to the middle relative density value.

21. A computer readable medium storing a computer program to be executed by a computer that has a relative density value storage portion storing therein at least three relative density values for at least three multilevel output values in one-to-one correspondence with each other, the at least three relative density values being defined dependently on a predetermined maximum density that is defined for a highest relative density value among the at least three relative density values, the program comprising:
  a program of receiving an input value indicative of density of a pixel in an input image;
  a program of calculating a corrected value by adding to the input value at least a part of an error value that has been generated by at least one pixel near to the subject pixel;
  a program comparing the corrected value with at least one of the at least two threshold values, converting the corrected value into one of the at least three multilevel values based on the compared results, outputting a resultant multilevel output value, referring to the threshold value storage portion, setting one relative density value that corresponds to the output value, calculating a difference between the corrected value and the relative density value, and setting the calculated result as an error value for the subject pixel; and
  a program of reducing, when the corrected value is close to at least one of the at least three relative density values, a frequency, at which the corrected value is converted into one multilevel output value that corresponds to the subject relative density value, thereby reducing a frequency at which the error value for the subject pixel becomes close to zero.

22. A computer readable medium storing a computer program to be executed by a computer that has a relative density value storage portion storing therein at least three relative density values for at least three multilevel output values in one-to-one correspondence with each other, the at least three relative density values being defined by normalizing the at least three multilevel output values based on a predetermined maximum density that is defined for a highest relative density value among the at least three relative density values, the at least three relative density values including a middle relative density value, a higher relative density value higher than the middle relative density value, and a lower relative density value lower than the middle relative density value, the at least three multilevel output values including a middle multilevel output value, a higher multilevel output value higher than the middle multilevel output value, and a lower multilevel output value lower than the middle multilevel output value, the higher, middle, and lower relative density values corresponding to the higher, middle, and lower multilevel output values, respectively, the program comprising:

a program of receiving an input value indicative of density of a pixel in an input image;

a program of calculating a corrected value by adding to the input value at least a part of an error value that has been generated by at least one pixel near to the subject pixel;

a program of comparing the corrected value with at least one of the at least two threshold values, the at least two threshold values including a higher threshold value and a lower threshold value that is lower than the higher threshold value, thereby converting the corrected value into one of the at least three multilevel values based on the compared results and outputting the resultant one multilevel output value, the comparing program converting the corrected value into the higher multilevel output value when the corrected value is greater than the higher threshold value, the comparing program converting the corrected value into the middle multilevel output value when the corrected value is between the higher threshold value and the lower threshold value, the comparing program converting the corrected value into the lower multilevel output value when the corrected value is smaller than the lower threshold value;

a program of referring to the threshold value storage portion and setting one relative density value that corresponds to the multilevel output value generated;

a program of calculating a difference between the corrected value and the set relative density value, and setting the calculated result as an error value for the subject pixel; and a program of modifying, upon receipt of the input value, both the higher and lower threshold values in a manner that both the higher and lower threshold values become closer to each other when the input value becomes close to the middle relative density value.

* * * * *